US 9,378,546 B2

(12) United States Patent
Jing et al.

(10) Patent No.: US 9,378,546 B2
(45) Date of Patent: Jun. 28, 2016

(54) IMAGE DEFECT VISIBILITY PREDICTOR

(75) Inventors: Xiaochen Jing, West Lafayette, IN (US); Hila Nachlieli, Haifa (IL); Carl Staelin, Haifa (IL); Doron Shaked, Yivon (IL); Smadar Shiffman, Tel Aviv (IL); Jan Allebach, West Lafayette, IN (US)

(73) Assignee: Hewlett-Packard Indigo B.V., Maastricht (NL)

( * ) Notice: Subject to any disclaimer, the term of this patent is extended or adjusted under 35 U.S.C. 154(b) by 418 days.

(21) Appl. No.: 13/349,275

(22) Filed: Jan. 12, 2012

(65) Prior Publication Data

US 2013/0182972 A1 Jul. 18, 2013

(51) Int. Cl.
 *G06T 7/00* (2006.01)

(52) U.S. Cl.
 CPC ....... *G06T 7/001* (2013.01); *G06T 2207/10024* (2013.01); *G06T 2207/30144* (2013.01)

(58) Field of Classification Search
 None
 See application file for complete search history.

(56) References Cited

U.S. PATENT DOCUMENTS

| | | | |
|---|---|---|---|
| 4,589,140 A * | 5/1986 | Bishop et al. | 382/148 |
| 6,005,670 A * | 12/1999 | Coleman | 358/1.9 |
| 6,396,422 B1 * | 5/2002 | Barkan | 341/76 |
| 7,162,102 B2 * | 1/2007 | Cahill et al. | 382/288 |
| 7,190,470 B2 | 3/2007 | Burquist et al. | |
| 7,376,269 B2 | 5/2008 | Klassen et al. | |
| 7,783,122 B2 | 8/2010 | Wu et al. | |
| 2002/0126893 A1 * | 9/2002 | Held et al. | 382/167 |
| 2003/0202215 A1 * | 10/2003 | Biddle et al. | 358/3.26 |
| 2004/0091168 A1 * | 5/2004 | Jones et al. | 382/261 |
| 2005/0225808 A1 * | 10/2005 | Braudaway et al. | 358/3.26 |
| 2007/0195351 A1 * | 8/2007 | Mashtare et al. | 358/1.13 |
| 2010/0149247 A1 * | 6/2010 | Yip et al. | 347/19 |
| 2010/0177330 A1 | 7/2010 | Wu et al. | |
| 2011/0075193 A1 | 3/2011 | Kumamoto et al. | |
| 2012/0062932 A1 * | 3/2012 | Rueby | 358/1.15 |

OTHER PUBLICATIONS

Jing, Xiaochen, et al. "Masking mediated print defect visibility predictor." IS&T/SPIE Electronic Imaging. International Society for Optics and Photonics, 2012.*
Zhang, Jia, et al. "Psychophysical evaluation of banding visibility in the presence of print content." IS&T/SPIE Electronic Imaging. International Society for Optics and Photonics, 2012.*
Pistor, T. "Rigorous 3D simulation of phase defects in alternating phase-shifting masks." Panoramic Technology Inc.(13 pages) (2002).*
Silverstein et al., "The Relationship Between Image Fidelity and Image Quality," Proc. of the IEEE, pp. 881-884, 2004.
Lubin, J., "A Visual Discrimination Model for Imaging Systems Design and Evaluation," Vision Models for Target Detection and Recognition (E. Peli, ed.), pp. 245-283, Singapore: World Scientific, 1995.
Zhang et al., "Color Image Fidelity Metrics Evaluated Using Image Distortion Maps," Signal Processing, vol. 70, No. 3, pp. 201-214, Mar. 5, 1998.

(Continued)

*Primary Examiner* — Michelle Entezari

(57) ABSTRACT

In at least some examples, a system comprises a processor and a memory coupled to the processor. The memory stores an image defect visibility predictor that, when executed by the processor, compares an original image with a defect image and outputs a predicted defect visibility image (PDVI) that accounts for defect masking by the original image.

18 Claims, 24 Drawing Sheets

(56) References Cited

OTHER PUBLICATIONS

Eskicioglu et al., "Image Quality Measures and Their Performance," IEEE Trans. on Communications, vol. 43, No. 12, pp. 2959-2965, 1995.
Watson, A., "The Cortex Transform Rapid Computation of Simulated Neural Images," Comput. Vision Graphics and Image Process., vol. 39, No. 3, pp. 311-327, 1987.
Daly, S., "The Visible Difference Predictor: an Algorithm for the Assessment of Image Fidelity," Human Vision, Visual Processing and Digital Display III, vol. SPIE 1666, (Bellingham, WA, USA), pp. 2-15, 1992.
Daly, S., "The Visible Differences Predictor: an Algorithm for the Assessment of Image Fidelity," Digital Images and Human Vision (A. B. Watson, ed.), pp. 179-205, Cambridge, MA: MIT Press, 1993.
Teo et al., "Perceptual Image Distortion," vol. SPIE 2179, pp. 127-141, 1994.
Heeger et al., "A Model of Perceptual Image Fidelity," Proc. of IEEE Int'l Conf. on Image Proc., (Washington, D.C., USA), pp. 343-345, Oct. 23-26, 1995.
Westen et al., "Perceptual Image Quality Based on a Multiple Channel HVS Model," Proc. of IEEE Int'l Conf. on Acoust., Speech and Sig. Proc., pp. 2351-2354, 1995.
Taylor et al., "Image Quality Assessment with a Gabor Pyramid Model of the Human Visual System," Human Vision and Electronic Imaging, vol. SPIE 3016, (San Jose, CA, USA), pp. 58-69, Feb. 8-14, 1997.
Taylor et al., "The Image Fidelity Assessor," Proc. of the IS&T Image Processing, Image, Quality, and Image Capture Systems Conference, pp. 237-241, 1998.
Avadhanam et al., "Evaluation of a Human Vision System Based Image Fidelity Metric for Image Compression," Applications of Digital Image Processing XXII, pp. 569-579, 1999.
Mantiuk, et al, "Visible Difference Predictor for High Dynamic Range Images," Proc. of IEEE International Conference on System, Man and Cybernetics, pp. 2763-2769, 2004.
Doll et al., "Robust, Sensor-Independent Target Detection and Recognition Based on Computational Models of Human Vision," Optical Engineering, vol. 37, pp. 2006-2021, 1998.
Ramanarayanan et al., "Visual Equivalence: Towards a New Standard for Image Fidelity," ACM Transactions on Graphics (TOG), vol. 26, No. 3, pp. 76-87, 2007.
Wang et al., "Image Quality Assessment: From Error Visibility to Structural Similarity," IEEE Trans. on Image Processing, vol. 13, No. 4, pp. 600-612, 2004.
Li et al., "Content-Partitioned Structural Similarity Index for Image Quality Assessment," Signal Processing, vol. 25, No. 7, pp. 517-526, 2010.
Channappayya et al., "Rate Bounds on SSIM Index of Quantized Images," IEEE Trans. on Image Processing, vol. 17, No. 9, pp. 1624-1639, Sep. 2008.
Min et al., "Development of Softcopy Environment for Primary Color Banding Visibility Assessment," Proc. SPIE 6808, vol. 68080A, p. 12, 2008.
Arslan et al., "Softcopy Banding Visibility Assessment," Journal of Imaging Science and Technology, vol. 51, No. 3, pp. 271-281, 2007.
Nachlieli, H., "Automatic Mechanical-Band Perceptual Evaluation," Proc. IS&TS NIP25, pp. 495-498, 2009.
Nachlieli et al., "Measuring the Quality of Quality Measures," IEEE Trans. on Image Processing, vol. 20, pp. 76-87, 2011.
Rawashdeh et al., "Printer Banding Estimation Using the Generalized Spectrum," Proc. of SPIE-IS&T, pp. 6059-15, 2006.
Fan et al., "Robust Estimation of Print Mottle," Proc. SPIE 6808, vol. 680808, pp. 1-7, 2008.
Eid et al., "Characterization of Mottle and Low-Frequency Print Defects," Proc. SPIE 6808, vol. 680808, p. 12, 2008.
Park et al., "A Psychophysical Investigation of the Effect of Coring on Perceived Toner Scatter," Journal of Electronic Imaging, vol. 19, No. 1, p. 011008, 2010.
Donohue et al., "Prediction of Print Defect Perception," Proc. of IS&T's PICS, pp. 44-49, 2003.
Eid et al., "A Unified Framework for Physical Print Quality," Proc. of SPIE 6494, pp. 64940C-11, 2007.
Kane et al., "Quantification of Banding, Streaking and Grain in Flat Field Images," Proc. of IS&T's PICS, pp. 79-83, 2000.
Legge et al., "Contrast Masking in Human Vision," Journal of the Optical Society of America, vol. 70, No. 12, pp. 1458-1471, 1980.
Watson et al., "Model of Visual Contrast Gain Control and Pattern Masking," Journal of the Optical Society of America, vol. A, No. 14, pp. 2379-2391, 1997.
Saadane, A., "Watermark Strength Determination Based on a New Contrast Masking Model," Proc. of SPIE 5020, vol. 5020, pp. 107-114, 2003.
Barten, P.G.J., "Simple Model for Spatial-Frequency Masking and Contrast Discrimination," Proc. of SPIE 2411, p. 142, 1995.
Barghout-Stein et al., "Partitioning Mechanisms of Masking: Contrast Transducer Versus Divisive Inhibition," Proc. of SPIE 3016, p. 25, 1997.
Watson, A.B., "Image Quality and Entropy Masking," Proc. of SPIE 3016, pp. 2-12, 1997.
Chandler et al., "Effects of Spatial Correlations and Global Precedence on the Visual Fidelity of Distorted Images," Proc. of SPIE 6057, pp. 60570E-15, 2006.
Kim et al., "Optimal Unsharp Mask for Image Sharpening and Noise Removal," Journal of Electronic Imaging, vol. 14, No. 2, p. 023005, 2005.
Zhang et al., "Adaptive Bilateral Filter for Sharpness Enhancement and Noise Removal," IEEE Trans. on Image Processing, vol. 17, No. 5, pp. 664-678, 2008.
Bergman et al., "Detection of Textured Areas in Natural Images Using an Indicator Based on Component Counts," Journal of Electronic Imaging, vol. 17, No. 4, p. 043003, 2008.
Turner, M. R., "Texture Discrimination by Gabor Functions," Biol Cybern, vol. 55, No. 2-3, pp. 71-82, 1986.
Cheng et al., "Multiscale Bayesian Segmentation Using a Trainable Context Model," IEEE Trans. on Image Processing, vol. 10, No. 4, pp. 511-525, 2001.
Bouman et al., "A Multiscale Random Field Model for Bayesian Image Segmentation," IEEE Trans. on Image Processing, vol. 3, No. 2, pp. 162-177, 1994.
Freund et al., "A Decision-Theoretic Generalization of On-Line Learning and an Application to Boosting," Journal of Computer and System Sciences, vol. 55, No. 1, pp. 119-139, 1997.
Viola et al., "Robust Real-Time Object Detection," International Journal of Computer Visio, 2001.
Harel et al., "Graph-Based Visual Saliency," Proceedings of Neural Information Processing Systems (NIPS), 2006.
Pedersen et al., "Image Quality Metrics for the Evaluation of Print Quality," vol. 7867, Jan. 24, 2011.

* cited by examiner

IMAGE DEFECT VISIBILITY PREDICTOR

BACKGROUND

In commercial printing contexts, it is quite reasonable that customers expect good print quality printed documents from a large scale high-end printer, such as the HP Indigo Digital Press series. The HP Indigo Digital Press series of presses are used for general commercial printing, including functions such as direct mail, publications, photo, flexible packaging, labels, and folding cartons. The HP Indigo Digital Press series of presses can also used for specialty printing, since this series of presses can print without films and plates. Furthermore, the HP Indigo Digital Press series of presses have several embedded in line scanners, which can enable the operators to compare the scanned image to the digital reference image on the fly. This function enables the operators to observe print defects, then change images, text, and jobs without stopping the press.

Due to customer expectations, print shops employing high-end printer need to design their workflow to pay attention to quality. Thus, the issue of print quality assessment is quite important for developers of commercial printing systems. However, there are not many well-developed integrated mea-sure-ments of print quality.

BRIEF DESCRIPTION OF THE DRAWINGS

For a detailed description of illustrative examples, reference will now be made to the accompanying drawings in which.

NOTATION AND NOMENCLATURE

Figure 1:
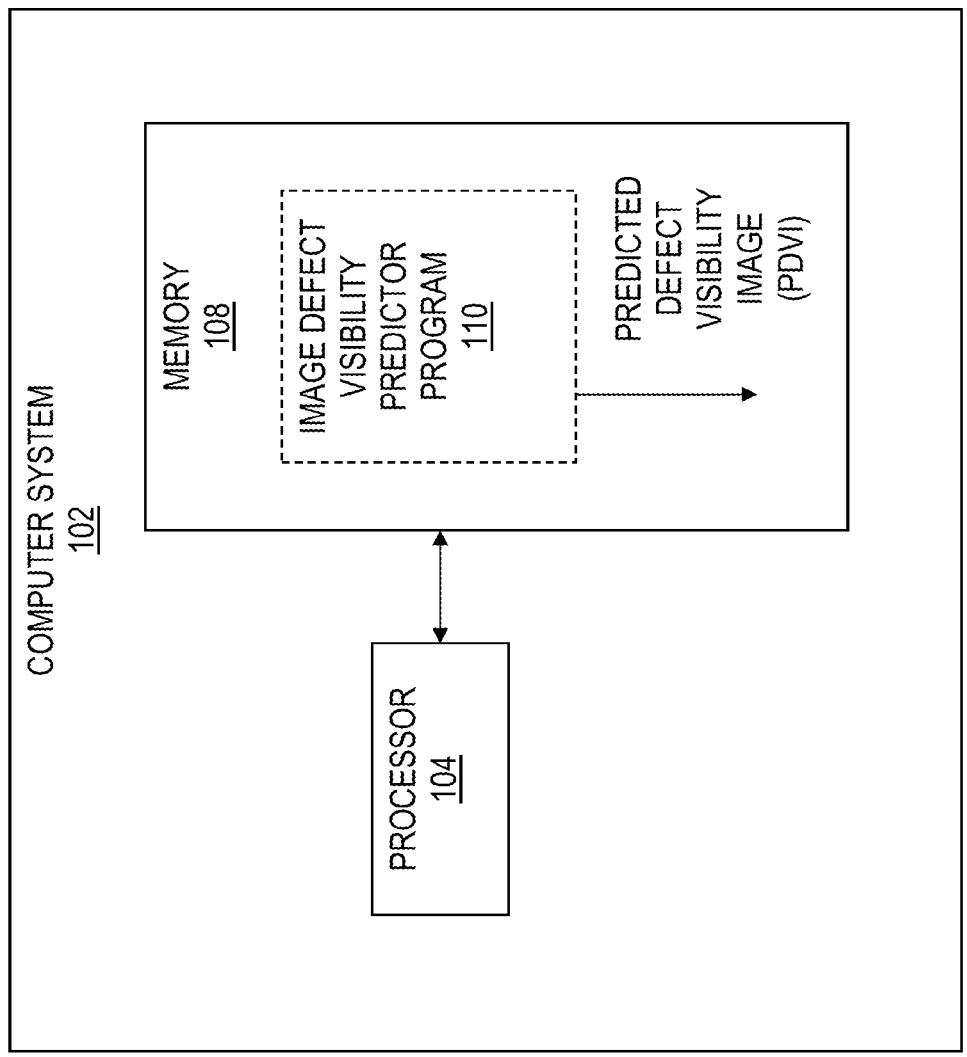
FIG. 1 shows a computer system in accordance with various examples of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Examples of the disclosure are directed to methods and systems for a Masking-Mediated Print Defect Visibility Predictor (MMPDVP) model or framework. Without limitation, the disclosed MMPDVP model is focused on the print quality for real printed documents produced by large-scale and high-end printers and predict the visibility of defects in the presence of customer content. In at least some examples, parameters of the MMPDVP model are trained from modified ground-truth images that have been marked by subjects. The output of the MMPDVP model (a predicted defect visibility image or PDVI) may be used to help a press operator decide whether the print quality is acceptable for specific customer requirements. The output of the MMPDVP model can also be used to optimize the print-shop workflow.

Typical documents printed commercially contain many images. This situation makes the images an important part in determining print quality. Images can be produced by many devices, such as monitors, printers, and copiers, although researchers usually focus on the image quality and image fidelity which are not produced by printers but rather the monitors or the cameras. The existing image quality or fidelity assessment models are still a valuable area for investigation. Image quality and image fidelity are not the same, but generally they are used interchangeably. As used herein, "image quality" refers to the preference of one image over the others, while "image fidelity" refers to the accuracy between two images. Here they are considered together in the same category, since most of the assessment models on image quality and fidelity have the same purpose. Usually, one can describe the image quality assessment assignments in the framework of image fidelity.

The disclosed MMPDVP model accepts two kinds of images as input: 1) a customer's original digital content image; and 2) a customer's original digital content image with defects. Using these inputs, the MMPDVP model will generate an overall predicted map that shows where the viewer might observe a defect.

In at least some examples, MMPDVP model will take into account the content-masking effect of natural images which are produced by a commercial high-end printer. The MMPDVP model also may train its parameters on modified ground truth images which are marked by subjects in a psychophysical experiment. Furthermore, since banding is one of the most common print defects, the MMPDVP model targets banding artifacts and provides a final prediction map that estimates where the viewer will observe banding.

FIG. 1 shows a computer system 100 in accordance with examples of the disclosure. As shown, the computer system 100 comprises a processor 104 in communication with a network interface 106 and a memory 108, where the memory 108 stores an image defect visibility predictor program 110. When executed by the processor 104, the image defect visibility predictor program 110, which comprises computer-readable instructions, compares an original content image with a defect image and outputs a predicted defect visibility image (PDVI) that accounts for defect masking. In at least some examples, the defect image is based on comparing the original content image with a scanned printout of the original content image.

The image defect visibility predictor program 110, when executed, may perform various operations to determine the PDVI for a customer's original digital content image. For example, the image defect visibility predictor program 110 may determine a masking potential value and a lightness value for the customer's digital original content image, determine a banding visibility value for the defect image, and output the PDVI based on the masking potential value, the lightness value, and the banding visibility value. Additionally or alternatively, the image defect visibility predictor program 110 may determine a texture value and/or a saliency value for the customer's original digital content image, and output the PDVI based on the texture value and/or the saliency value. Further, the image defect visibility predictor program 110, when executed, may determine a masking potential index image and a lightness index image based on the customer's original digital content image, and a banding visibility index image based on the defect image. Similarly, the image defect visibility predictor program 110, when executed, may determine a texture index image and a saliency index image.

In at least some examples, the image defect visibility predictor program 110 employs a look-up table (LUT) to select the PDVI based on the masking potential index image, the lightness index image, the banding visibility index image, the texture index image, and/or the saliency index image. To determine the masking potential index image, the image defect visibility predictor program 110 may quantize a masking potential image that results from application of a local standard deviation to the original content image. Further, the image defect visibility predictor program 110, when executed, may determine the lightness index image by quantizing lightness values detected for the original content image. Further, the image defect visibility predictor program 110, when executed, may determine the banding visibility index image by quantizing a banding visibility image determined for the defect image. Further, the image defect visibility predictor program 110, when executed, may determine the texture index image by quantizing a texture map or image determined for the original content image. Further, the image defect visibility predictor program 110, when executed, may determine the saliency index image by quantizing a saliency map or image determined for the original content image. As will later be described in further detail, the image defect visibility predictor program 110 may be trained using a set of ground truth images marked by human subjects.

Figure 2:
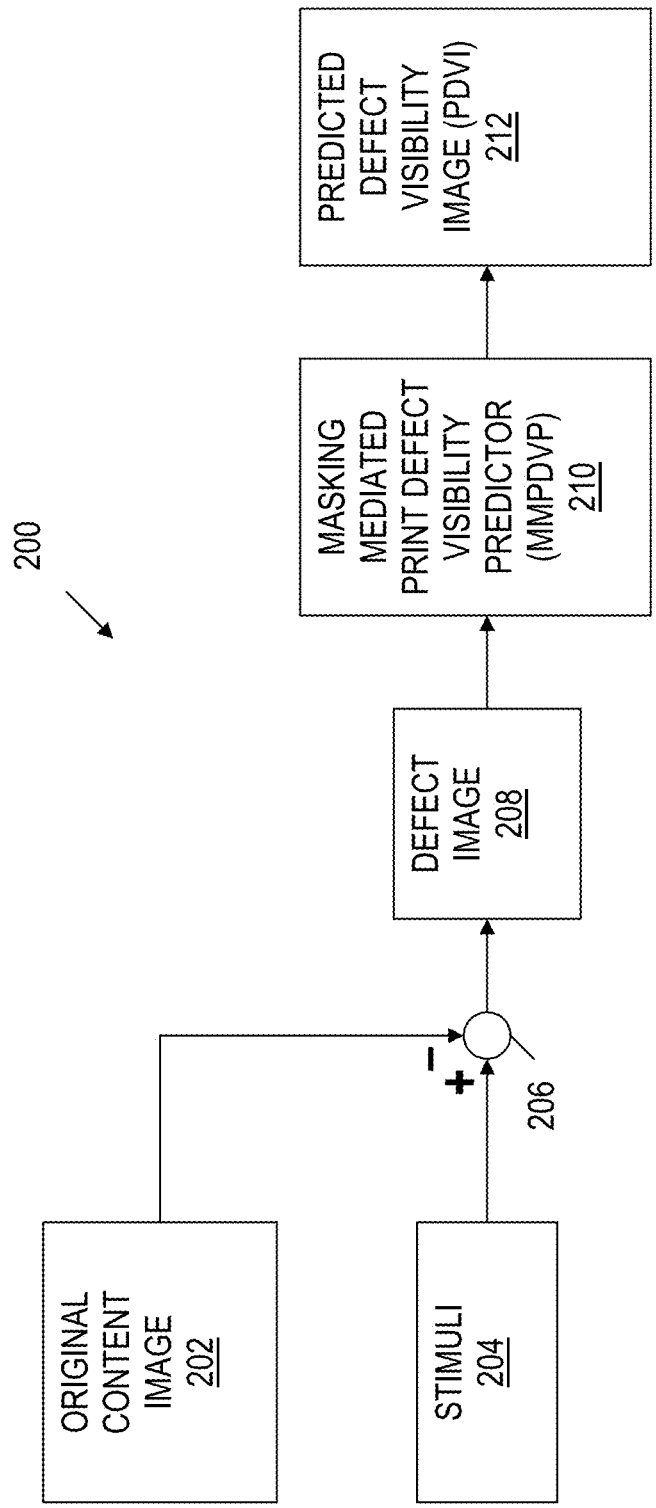
FIG. 2 shows a block diagram of system components and operations in accordance with various examples of the disclosure.

FIG. 2 shows a block diagram 200 of system components and operations in accordance with various examples of the disclosure. As shown in the block diagram 200, an original content image 202 and stimuli 204 are compared by comparison component 206 to generate a defect image 208. The defect image 208 is input to a MMPDVP 210, which outputs a corresponding PDVI 212.

Figure 3:
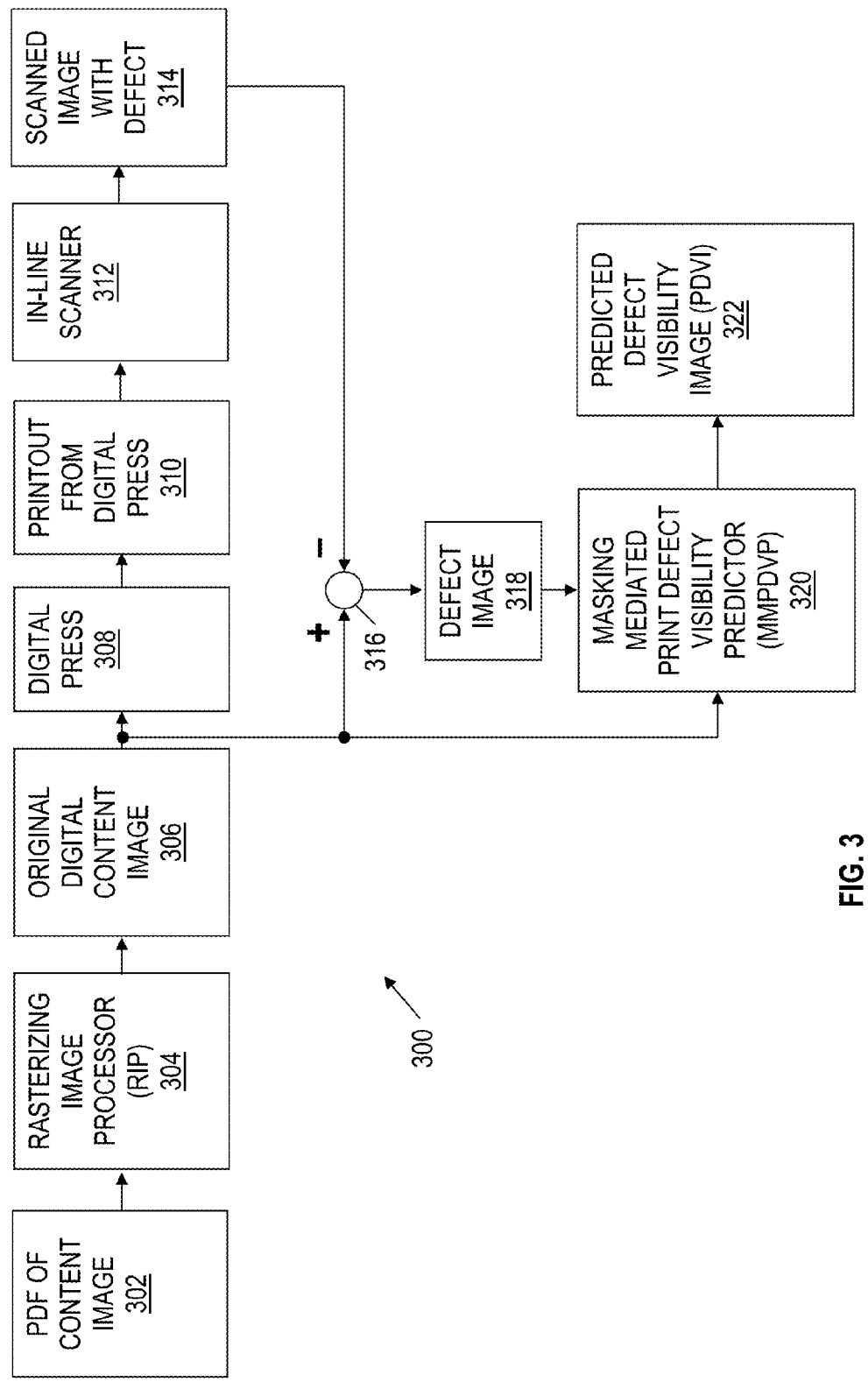
FIG. 3 shows another block diagram of system components and operations in accordance with various examples of the disclosure.

FIG. 3 shows another block diagram 300 of system components and operations in accordance with various examples of the disclosure. In the block diagram 300, a portable document format (PDF) of an original content image 302 is provided to a rasterizing image processor (RIP) 304, which converts the PDF file into an original digital content image 306. The original digital content image 306 is input to the digital press 308 to generate a printout 310. The printout 310 is scanned by in-line scanners 312 to provide a scanned image 314 with defects.

As shown, the customer's original digital content image 306 and the scanned image 314 are compared by comparison component 316, resulting in defect image 318. The MMPDVP 320 receives the original content image 306 and the defect image 318 as input and outputs the PDVI 322, where the gray-scale levels of the PDVI 322 indicate the visibility of the defects. More specifically, black in the PDVI 322 indicates a low probability that customers will observe a defect and white indicates a high probability that customers will observe a defect. Various intermediate gray-scale values can be used also to show different likelihoods that customers will observe a defect. In the disclosed PDVI examples, banding is the defect being analyzed and thus black indicates a low probability that banding will be detected by consumers, while white indicates that there is a high probability that banding will not be detected by consumers. Other defects may additionally or alternatively be analyzed in addition to banding. Examples of defects include streaks, spots, ghosting defects, and repetitive defects due to contamination or damage to a rotating component.

Figure 4:
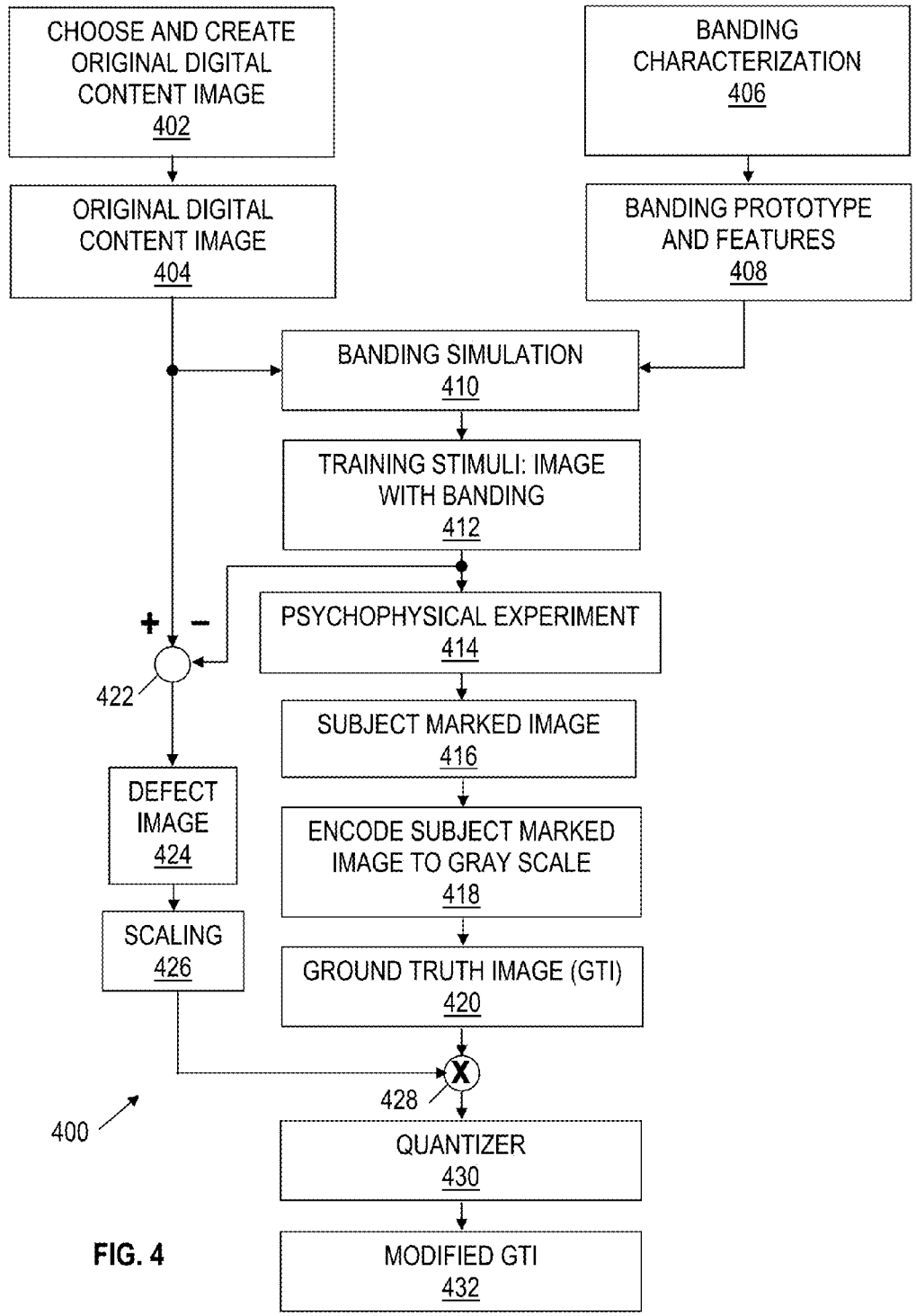
FIG. 4 shows a block diagram of system components and operations for training an image defect visibility predictor in accordance with various examples of the disclosure.

FIG. 4 shows a block diagram 400 of system components and operations for training an image defect visibility predictor in accordance with various examples of the disclosure. In the block diagram 400, a customer's original digital content image 404 is chosen and/or created at block 402. Also, a banding characterization module 406 is used to determine the banding prototype signal and banding features 408. The original digital content image 404 (sometimes referred to herein as $C_o[m,n]$) and the banding prototype and features 408 are input to banding simulation block 410, which outputs an image with banding as a training stimulus 412. Repeating this process for different banding prototype signals and different original digital content images results in a set of training stimuli. The training stimuli 412 are provided to human subjects as part of a psychophysical experiment 414, which results in a set of subject marked images. Each such subject marked image 416 (sometimes referred to herein as $S[m,n]$) indicates where banding is detected. The subject marked image 416 is encoded to gray scale at block 418, resulting in a ground truth image (GTI) 420 (sometimes referred to herein as $G[m,n]$). The GTI 420 is provided as an input to multiplier 428. The other input of the multiplier 428 is obtained by comparing the original digital content image 404 with the training stimuli (e.g., an image with banding) 412 using comparison component 422. The output of the comparison component 422 is defect image 424, which is scaled at block 426 prior to being input to the multiplier 428.

The multiplier 428 operates to prevent banding marks in the GTI 420 that are based on improper marking in the subject marked image 416 from being propagated. The output of the multiplier 428 is provided to quantizer 430, which quantizes the values from the multiplier 428, resulting in a modified GTI 432. For example, the quantizer 430 may operate to assign a value of 0, 1, 2, or 3 to the pixels or regions of the GTI 420. The value 0 may correspond to areas that were not marked by a subject. The value 1 may correspond to areas that were marked with a first color (e.g., green) that represents a low level of defects (e.g., banding). The value 2 may correspond to areas that were marked with a second color (e.g., yellow) that represents a medium level of defects. The value 3 may correspond to areas that were marked with a third color (e.g., red) that represents a high level of defects.

Figure 10:
FIG. 10 shows a screenshot of an original content image in accordance with an example of the disclosure.
Figure 11:
FIG. 11 shows a screenshot of the original content image of FIG. 10 with banding defects in accordance with an example of the disclosure.
Figure 12:
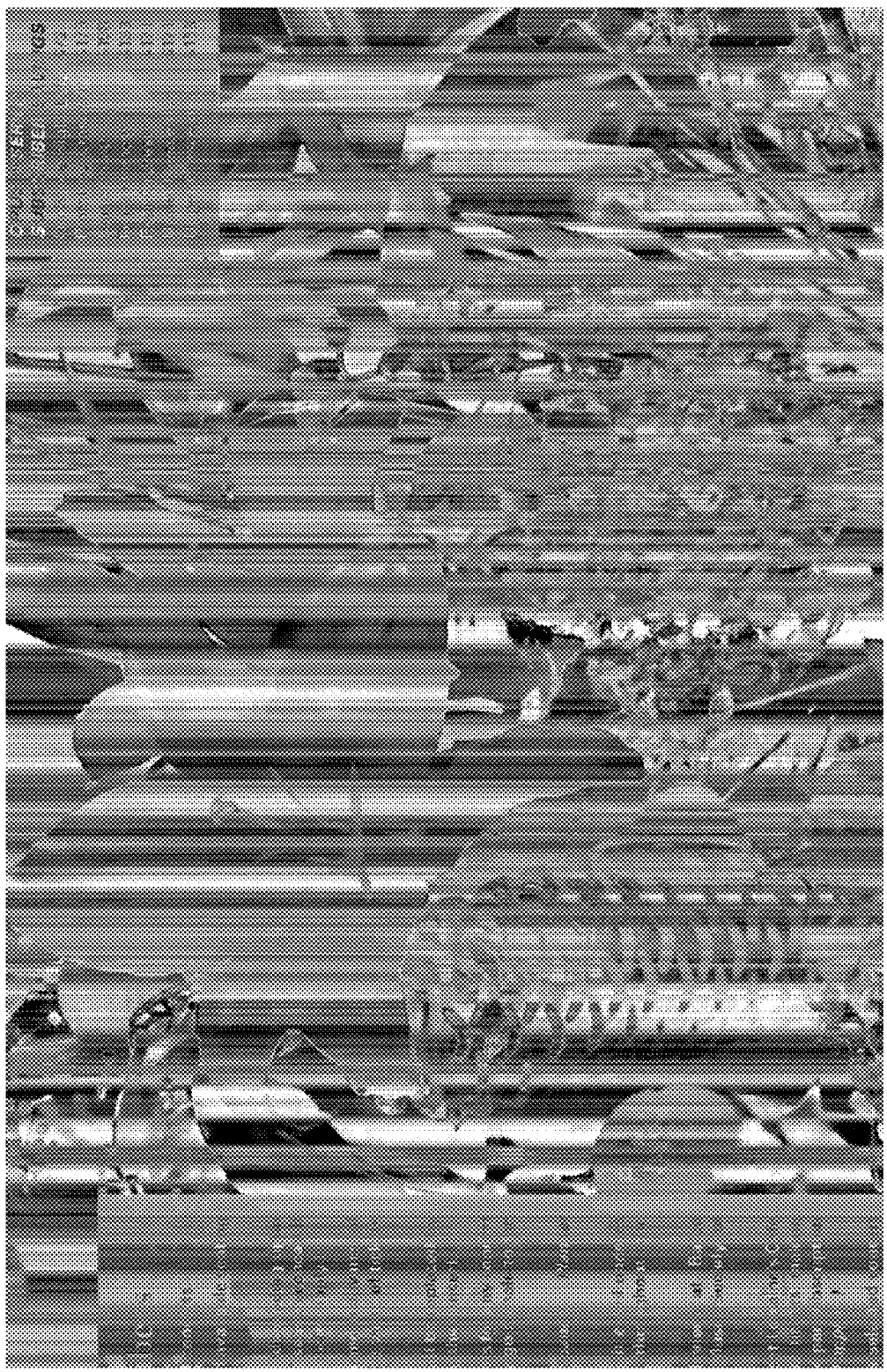
FIG. 12 shows a screenshot of a defect image related to the defects of FIG. 11 in accordance with an example of the disclosure.
Figure 13:
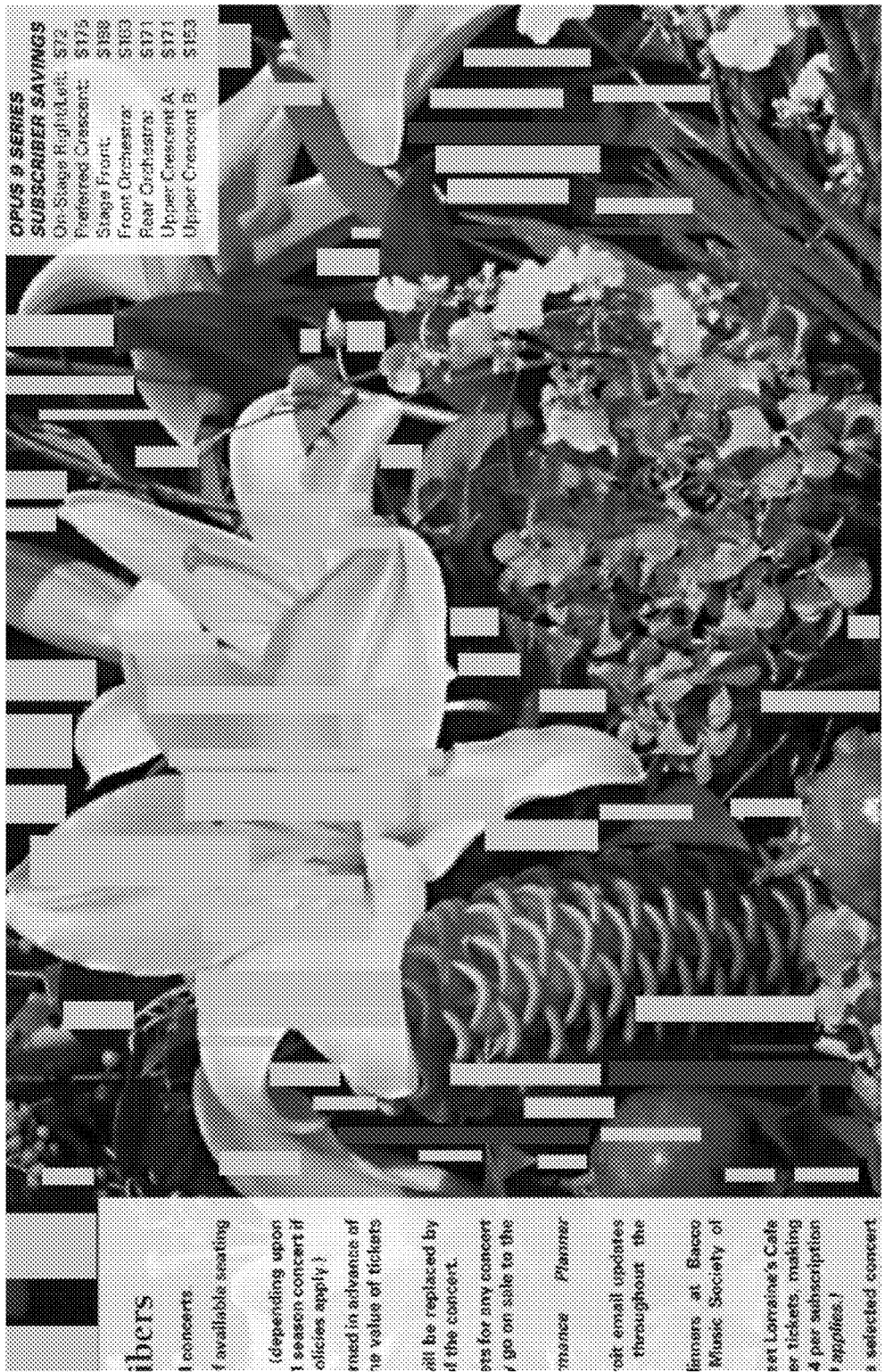
FIG. 13 shows a screenshot of a subject marked image related to defects of FIG. 11 in accordance with an example of the disclosure.
Figure 14:
FIG. 14 shows a screenshot of a ground truth image related to the defects of FIG. 11 in accordance with an example of the disclosure.
Figure 15:
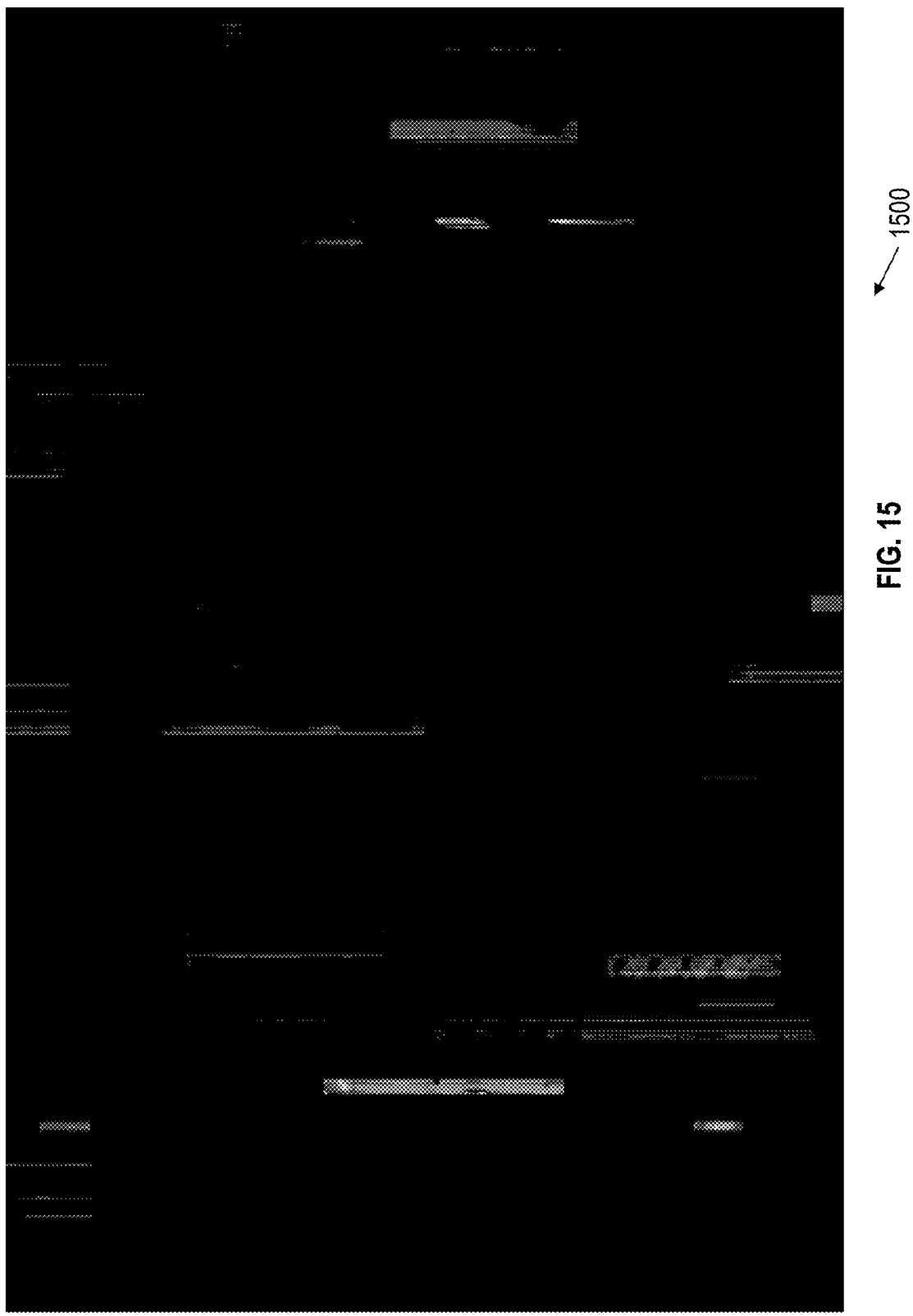
FIG. 15 shows a screenshot of a modified ground truth image related to the defects of FIG. 11 in accordance with an example of the disclosure.

As previously mentioned, banding is one of the most common print artifacts. It usually appears as a luminance variation and a chromatic variation across a printed page in the scan direction, which is perpendicular to the paper process direction. FIG. 10 shows a screenshot 1000 of an original content image in accordance with examples of the disclosure. FIG. 11 shows a screenshot 1100 of the original content image of FIG. 10 with banding defects. FIG. 12 shows a screenshot 1200 of a defect image (e.g., defect image 424) related to the defects of FIG. 11 in accordance with an example of the disclosure. FIG. 13 shows a screenshot 1300 of a subject marked image related to defects of FIG. 11 in accordance with an example of the disclosure. FIG. 14 shows a screenshot 1400 of a ground truth image (e.g., GTI 420) related to the defects of FIG. 11 in accordance with an example of the disclosure. FIG. 15 shows a screenshot 1500 of a modified ground truth image (e.g., MGTI 432) related to the defects of FIG. 11 in accordance with an example of the disclosure.

Figure 5:
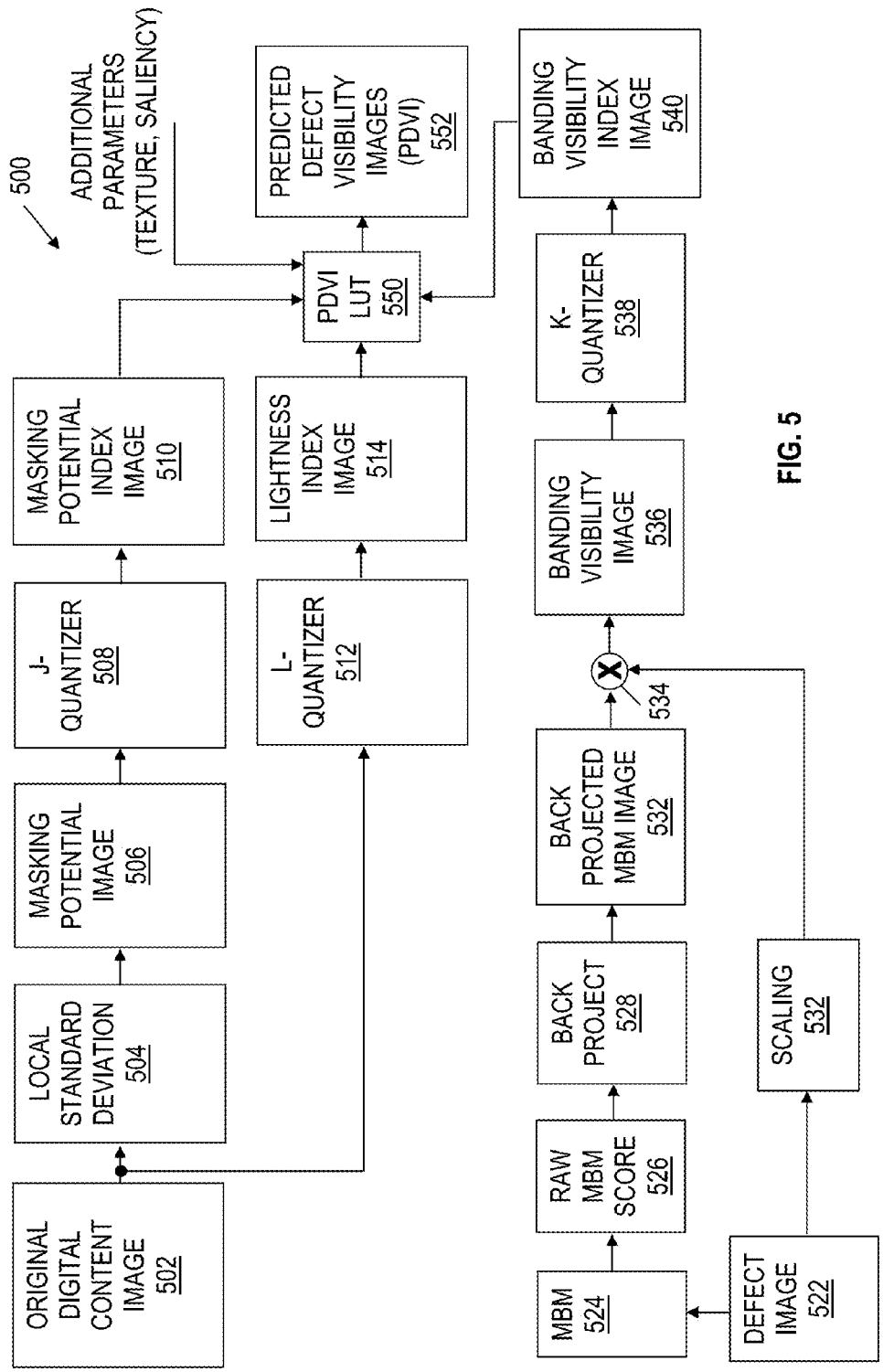
FIG. 5 shows a framework for an image defect visibility predictor in accordance with various examples of the disclosure.

FIG. 5 shows a framework 500 for an image defect visibility predictor in accordance with various examples of the disclosure. The operation of the framework 500 may be performed, for example, by execution of the image defect visibility predictor 110 described previously. In framework 500, an original digital content image 502 and a defect image 522 are provided as inputs and a PDVI look-up table (LUT) 550 is used to select or generate a PDVI 552. The inputs to the PDVI LUT 550 may correspond to a masking potential value, a lightness value, and a banding visibility value. Additionally or alternatively, a texture value and/or a saliency value may be inputs to the PDVI LUT 550 to select or generate PDVI 552.

To obtain the masking potential value, a local standard deviation 504 is applied to the original digital content image 504, resulting in a masking potential image 506. A J-quantizer algorithm 508 is then applied to the masking potential image 506, resulting in a masking potential index image 510. In at least some examples, the masking potential index image 510 corresponds to the masking potential value considered by the PDVI LUT 550 to determine PDVI 552.

To obtain the lightness value, an L-quantizer algorithm 512 is applied to the original digital content image 502, resulting in a lightness index image 514. In at least some examples, the lightness index image 514 corresponds to the lightness value considered by the PDVI LUT 550 to determine PDVI 552.

Figure 6:
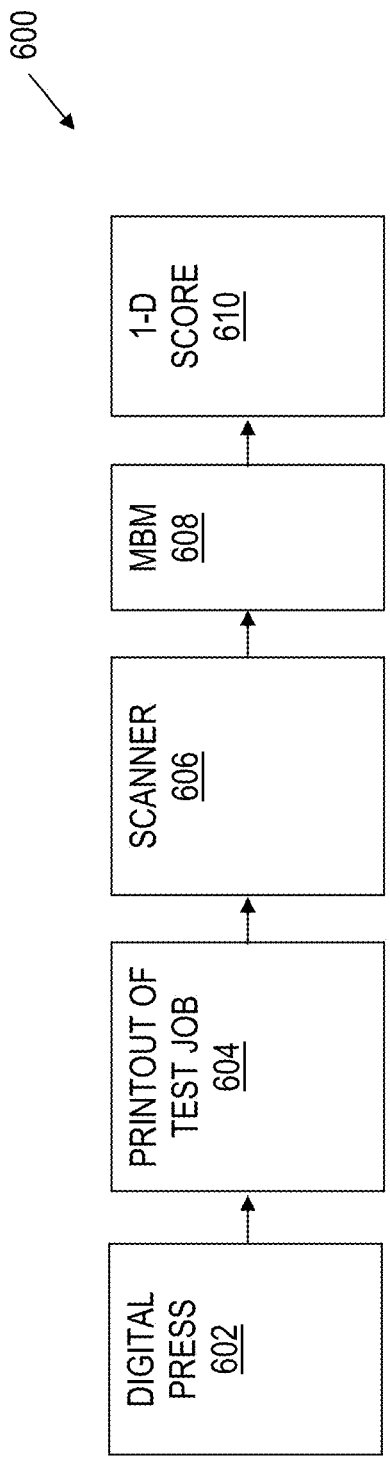
FIG. 6 shows a mechanical band measurement (MBM) overview in accordance with various examples of the disclosure.
Figure 17:
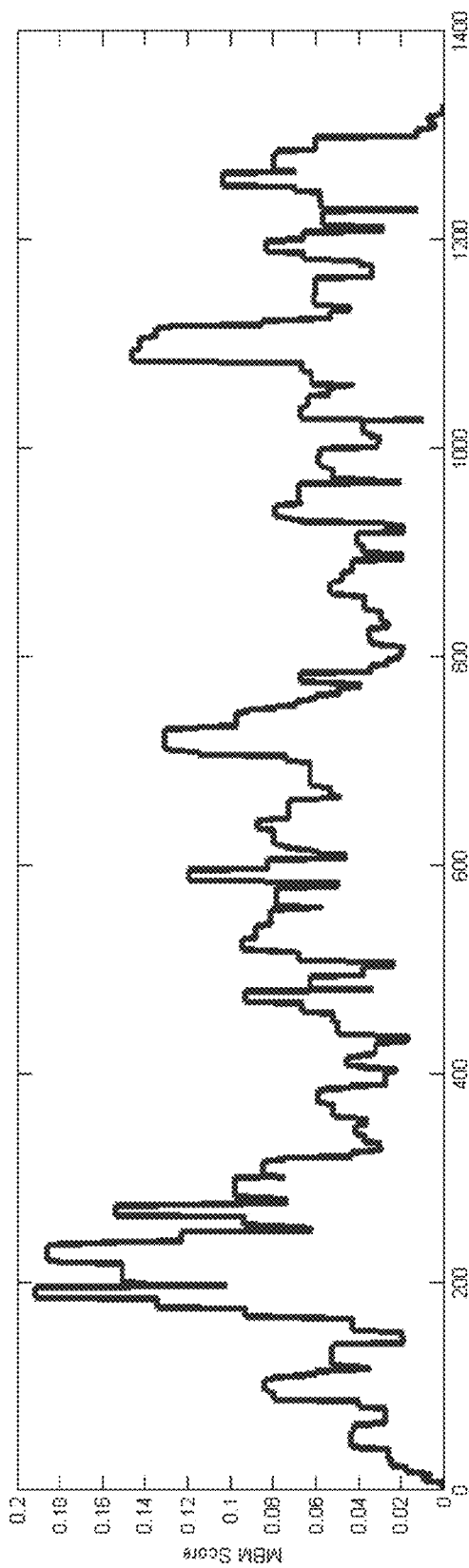
FIG. 17 shows a screenshot of a raw mechanical band measurement (MBM) score chart in accordance with an example of the disclosure.

To obtain the banding visibility value, the defect image 522 is provided to a mechanical band measurement (MBM) algorithm 524, resulting in a raw MBM score 526. FIG. 17 shows a screenshot 1700 of a raw MBM score chart related to a defect image in accordance with an example of the disclosure. Further, FIG. 6 shows a mechanical band measurement (MBM) overview 600 in accordance with various examples of the disclosure. As shown in the MBM overview 600, an digital press 602 generates a printout of a test job 604. The printout 604 is scanned by scanner 606 and an MBM algorithm 608 is applied to the scanned image, resulting in a 1-D score 610.

Figure 18:
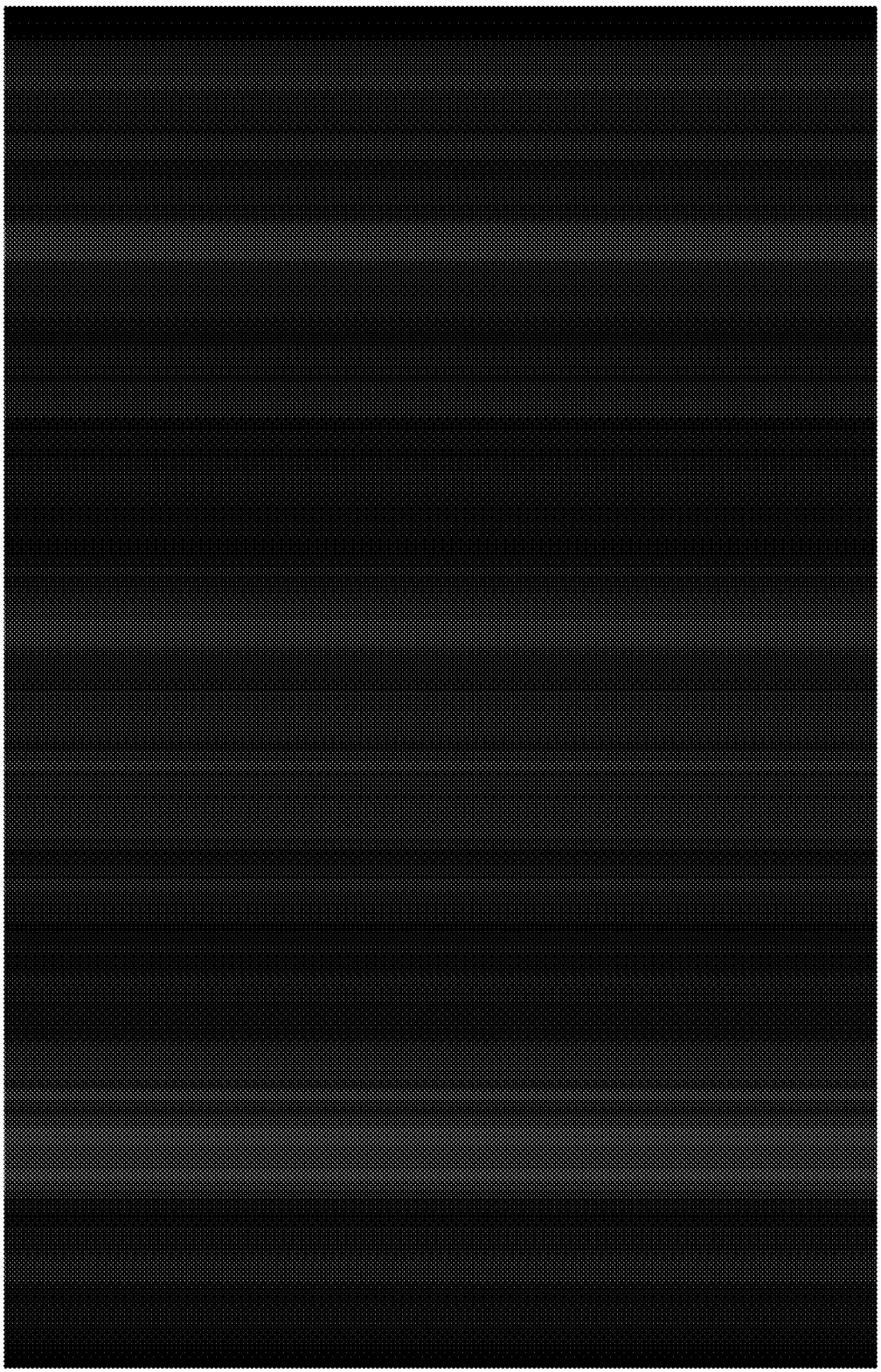
FIG. 18 shows a screenshot of a back projected MBM image in accordance with an example of the disclosure.
Figure 19:
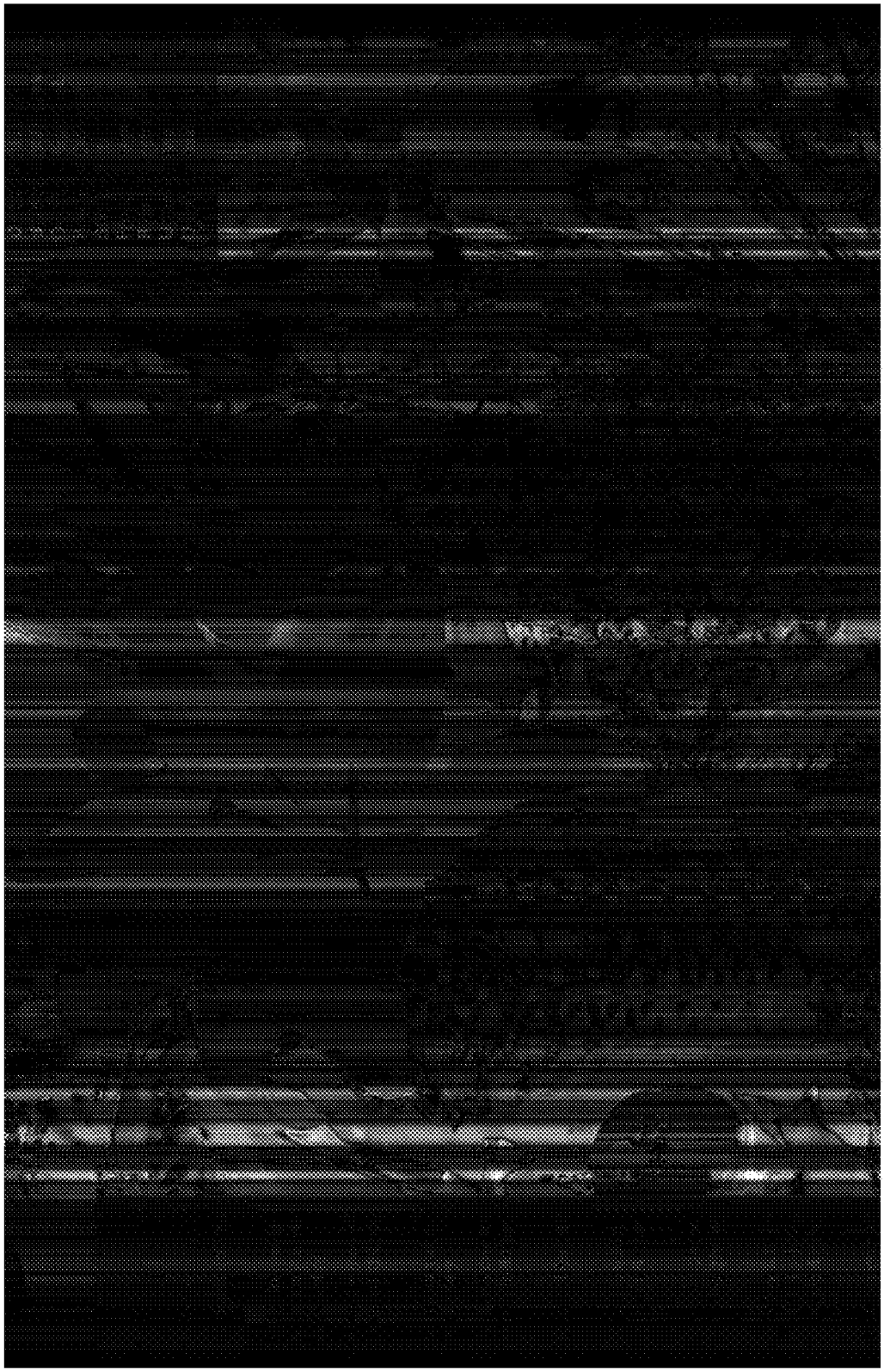
FIG. 19 shows a screenshot of a modulated MBM image in accordance with an example of the disclosure.

Returning to FIG. 5, the raw MBM score 526 is input to the back projection algorithm 528, resulting in a back projected MBM image 532. FIG. 18 shows a screenshot 1800 of a back projected MBM image in accordance with an example of the disclosure. The back projected MBM image 532 is input to a multiplier 534. The other input to the multiplier 534 corresponds to a scaled version (performed by scaling block 532) of the defect image 522. The output of the multiplier 534 corresponds to a banding visibility image 536 that is then provided to a K-quantizer algorithm 538, resulting in a banding visibility index image 540. FIG. 19 shows a screenshot 1900 of a modulated MBM image (referred herein as $B[m,n]$) in accordance with an example of the disclosure. The modulated MBM image of screenshot 1900 corresponds to the banding visibility image 536 output from the multiplier 534. In at least some examples, the banding visibility index image 540 corresponds to the banding visibility value considered by the PDVI LUT 550 to determine PDVI 552.

Figure 16:
FIG. 16 shows a screenshot of a predicted defect visibility image (PDVI) related to the defects of FIG. 11 in accordance with an example of the disclosure.
Figure 20:
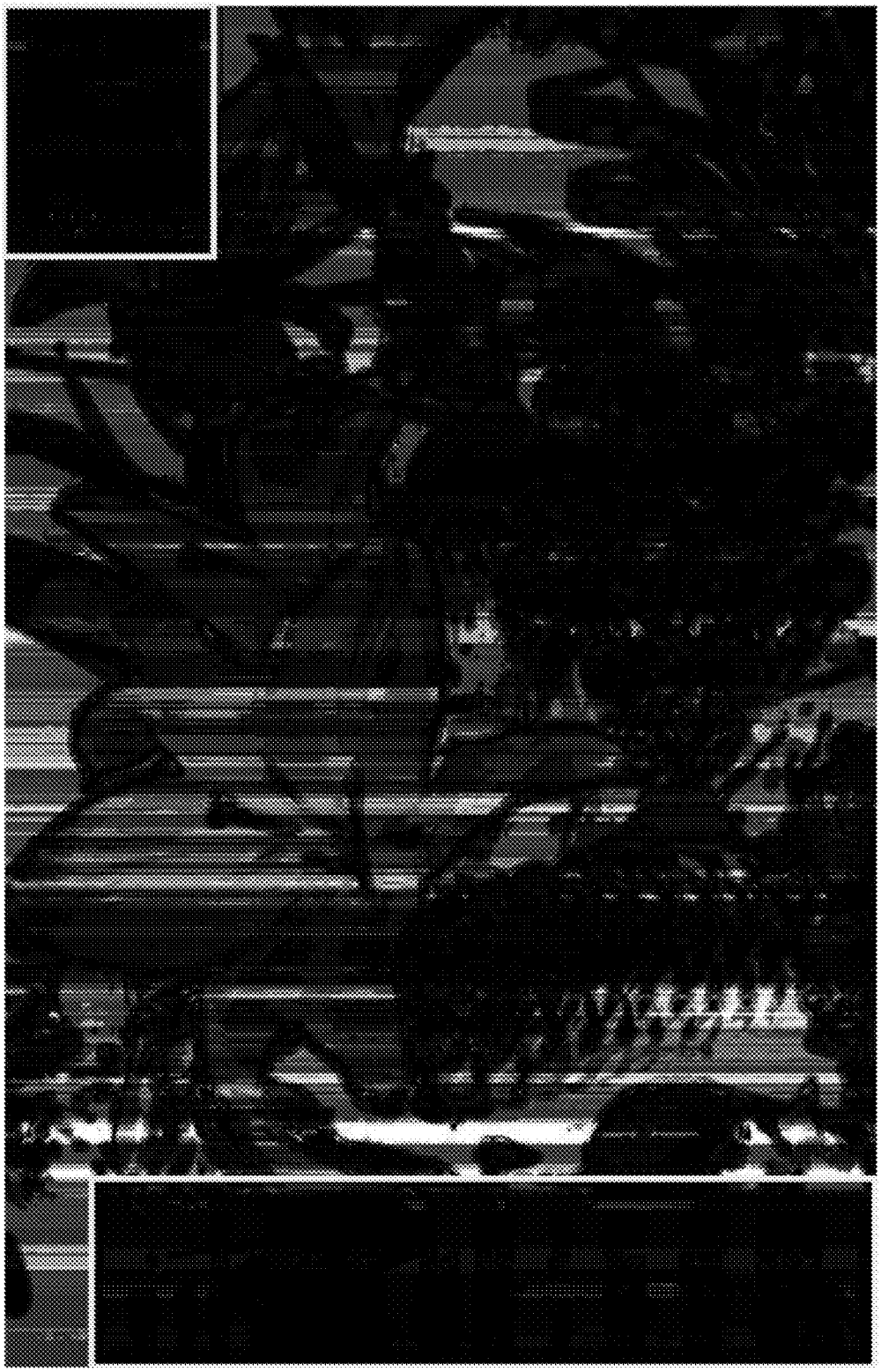
FIG. 20 shows a screenshot of a PDVI result related to the defects of FIG. 11 for a first quantization level in accordance with an example of the disclosure.
Figure 21:
FIG. 21 shows a screenshot of a PDVI result related to the defects of FIG. 11 for a second quantization level in accordance with an example of the disclosure.

FIG. 16 shows a screenshot 1600 of a PDVI (e.g., PDVI 552) related to the defects of FIG. 11 in accordance with an example of the disclosure. The PDVI of screenshot 1600 is based on a quantization level where L=K=J=32. FIG. 20 shows a screenshot 2000 of a PDVI (e.g., PDVI 552) related to the defects of FIG. 11 in accordance with an example of the disclosure. The PDVI of screenshot 2000 is based on a quantization level where L=K=J=16 and where text areas of the image are noted since they have different banding visibility characteristics compared to other types of image content. FIG. 21 shows a screenshot 2100 of a PDVI (e.g., PDVI 552) related to the defects of FIG. 11 in accordance with an example of the disclosure. The PDVI of screenshot 2100 is based on a quantization level where L=K=J=32 (the same quantization as the screenshot 1600 of FIG. 16) and where text areas of the image are noted since they have different banding visibility characteristics compared to other types of image content. Comparing the noted text areas in FIG. 20 and FIG. 21, FIG. 21 shows a more accurate result, since the PDVI has less response (black color) to indicate low banding visibility prediction in those noted areas, where the subject didn't mark in FIG. 13. The PDVI result in FIG. 21 also shows high response (white color) to indicate high banding visibility prediction in the noted areas shown in FIG. 13, where the subject observes strong banding.

Figure 22:
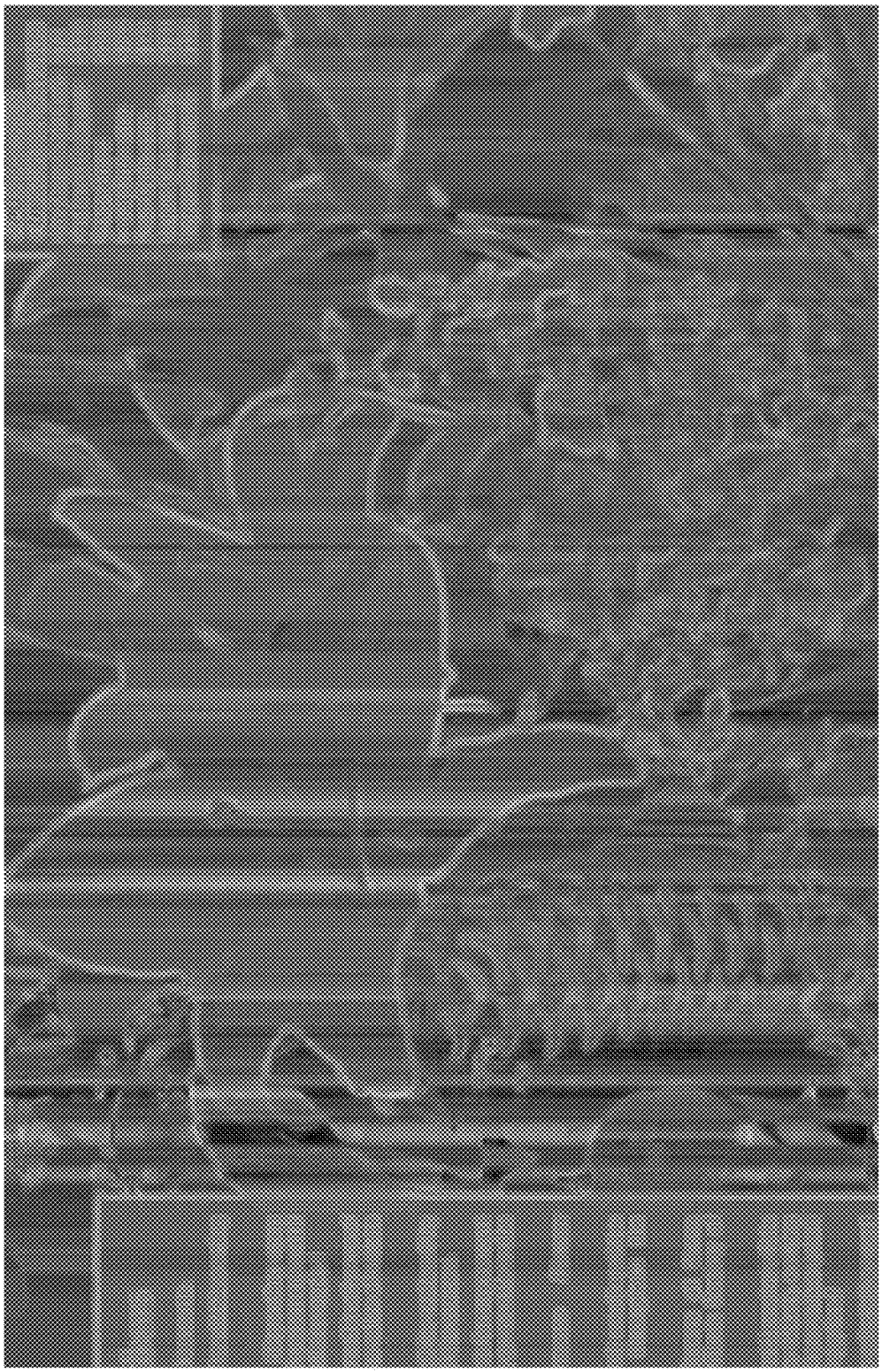
FIG. 22 shows a screenshot of a visualization map related to the defects of FIG. 11 for the second quantization level in accordance with an example of the disclosure.

FIG. 22 shows a screenshot 2200 of a visualization map for quantization level L=K=J=32. The visualization map of screenshot 2200 is used to test and illustrate the MMPDVP model. In the visualization map, a unique value to each j, k and l level is assigned respectively into the R, G, B channel. In this manner, it can be verified that each J, K, and L combination has a different fixed color in this map, which means each combination is independent from the others.

Figure 23:
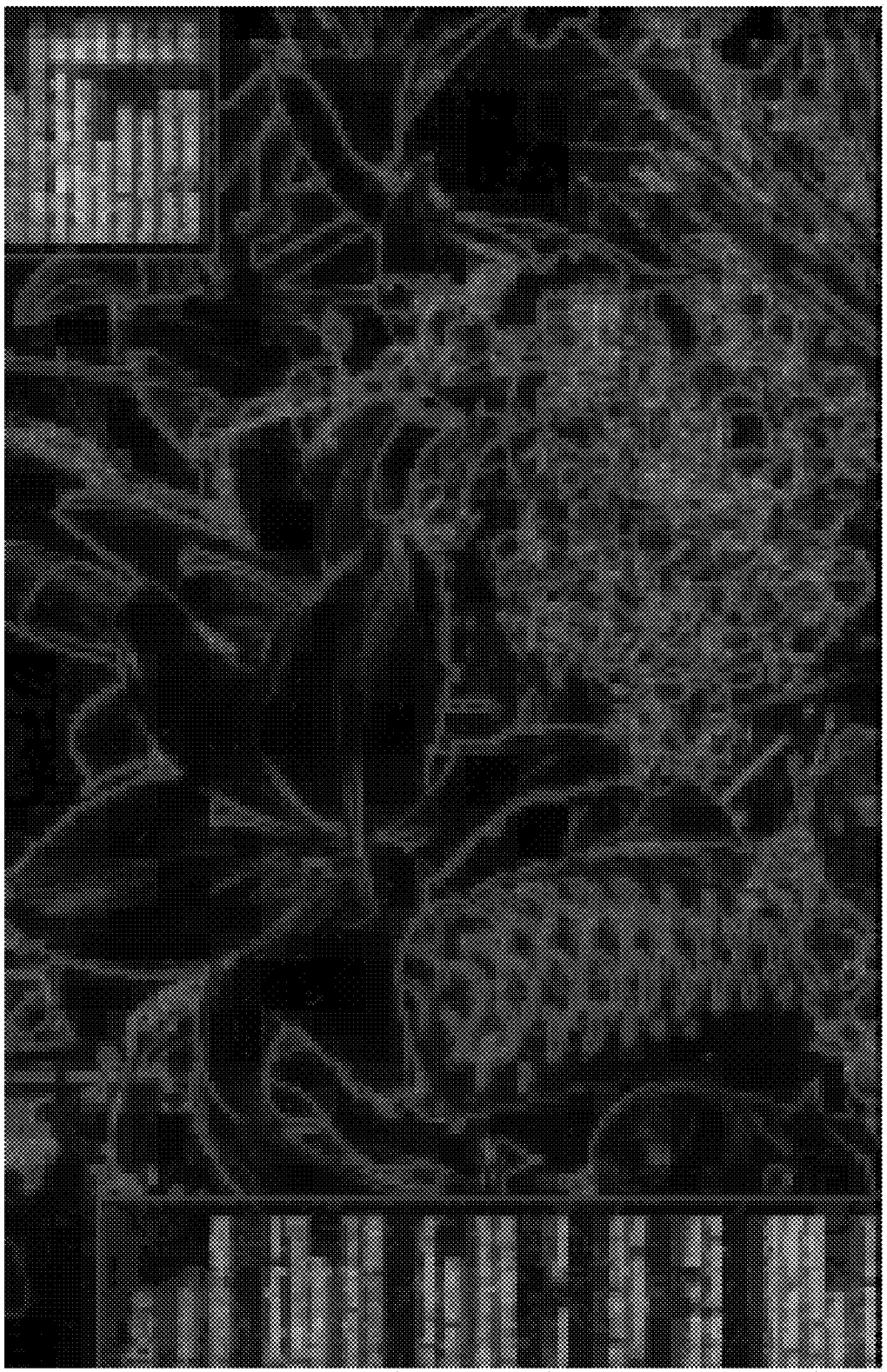
FIG. 23 shows a screenshot of a texture likelihood map for the original content image of FIG. 10 in accordance with an example of the disclosure.

As shown in FIG. 5, additional parameter values may be input to the PDVI LUT 550. For example, a texture value could additionally or alternatively be input to the PDVI LUT 550. The texture value may de determined, for example, by detecting texture from an original content image, resulting in a texture likelihood image or map (T[m,n]). FIG. 23 shows a screenshot 2300 of a texture likelihood map for the original content image of FIG. 10 in accordance with an example of the disclosure. The texture likelihood map of screenshot 2300 may be used to determine a texture value that is one basis for determining PDVI 552. As with the other feature inputs described herein, a texture likelihood map may be quantized and a texture likelihood index image (t[m,n]) may correspond to the texture value provided as input to the PDVI LUT 550.

Another parameter value that may additionally or alternatively be input to the PDVI LUT 550 is a saliency value. The saliency value may be determined, for example, by pre-processing the original content image to identify saliency-objects. Identification of saliency-objects is used to build a saliency-object map ($S_o[m,n]$). As with the other feature inputs described herein, a saliency-object map may be quantized and a saliency-object index image ($S_o[m,n]$) may correspond to the saliency value provided as input to the PDVI LUT 550. In at least some examples, the saliency value should provide sharp boundaries for saliency-objects.

Figure 7:
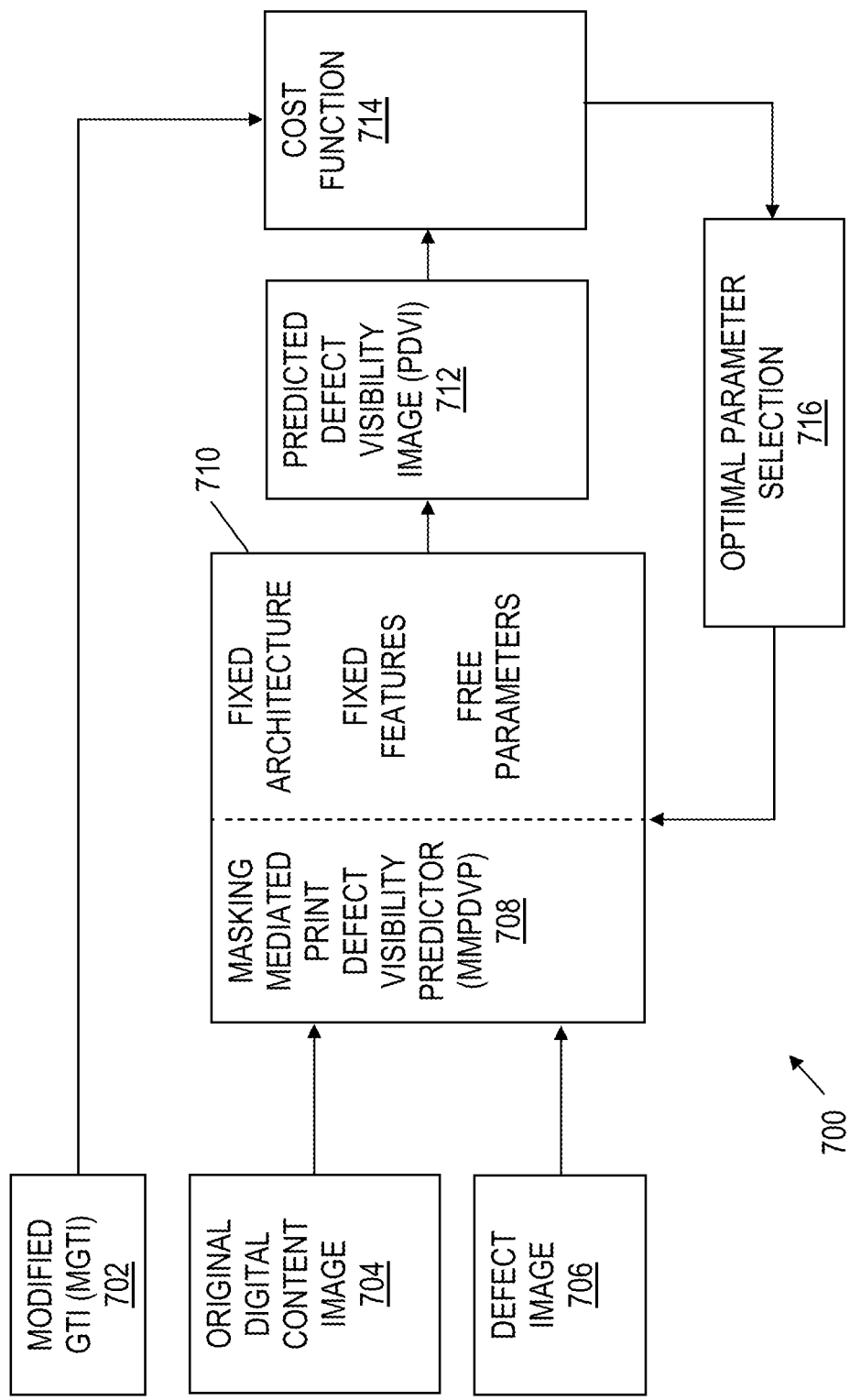
FIG. 7 shows a framework for training an image defect visibility predictor in accordance with various examples of the disclosure.

FIG. 7 shows a framework 700 for training an image defect visibility predictor in accordance with various examples of the disclosure. In framework 700 a modified GTI 702 is input to a cost function 714. The cost function 714 also receives as input a PDVI 712 that is output from a MMPDVP 708 based on an original digital content 704 and a defect image 706. As shown, the MMPDVP 708 uses fixed architecture, fixed features, and free parameters at block 710, which may be updated by an optimal parameter selection block 716 that receives an output of the cost function 714. In accordance with some examples, the cost function 714 penalizes the difference between the output PDVI of the MMPDVP and the modified ground truth data. This cost function is minimized by optimal parameter selection 716 to obtain optimized parameters at block 710 for the predictor 708.

Figure 8:
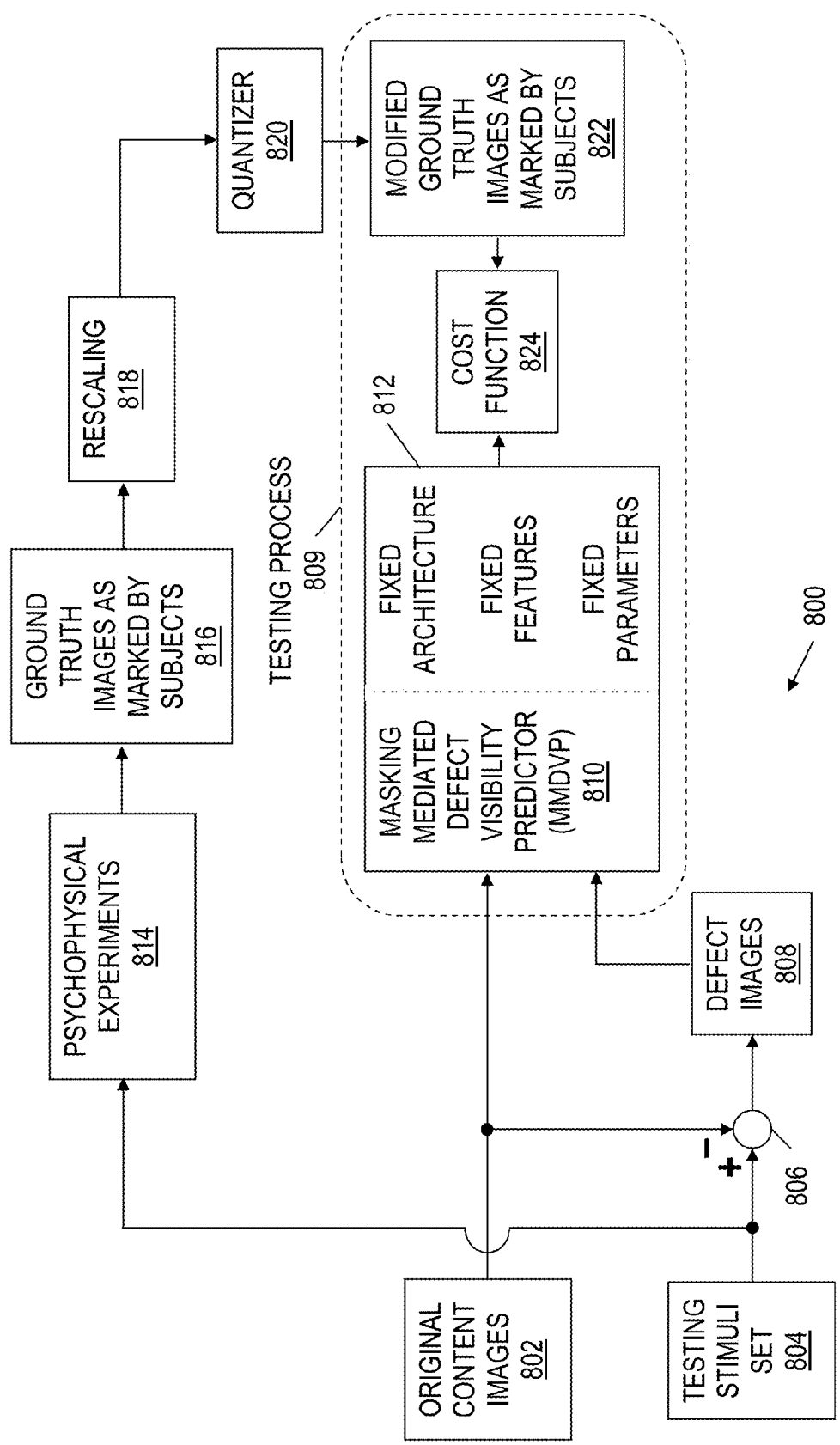
FIG. 8 shows a framework for testing an image defect visibility predictor in accordance with various examples of the disclosure.

FIG. 8 shows a framework 800 for offline testing of an image defect visibility predictor in accordance with various examples of the disclosure. The framework 800 includes a testing process 809 that uses an MMPDVP 810 with fixed architecture, fixed features, and fixed parameters at block 812 to provide input to a cost function 824. At this stage, the free parameters of block 710 have been chosen by optimal parameter selection 716, and are now fixed at block 812. The cost function 824 also receives modified ground truth images 822 as marked by subjects as input. Over time, the MMPDVP 810 may output a plurality of PDVIs to the cost function 824. Each PDVI is based on a given defect image from defect images 808 and a given original content image from original content images 802. As shown, the defect images 808 are the result of comparing (using comparison component 806) original content images 802 with stimuli from testing stimuli set 804. The testing stimuli set 804 is also used for psychophysical experiments 814, resulting in ground truth images 816 as marked by subjects. The modified ground truth images 822 that are input to the cost function 824 are obtained by rescaling and quantizing the ground truth images 816 at rescaling block 818 and quantizing block 820.

Figure 9:
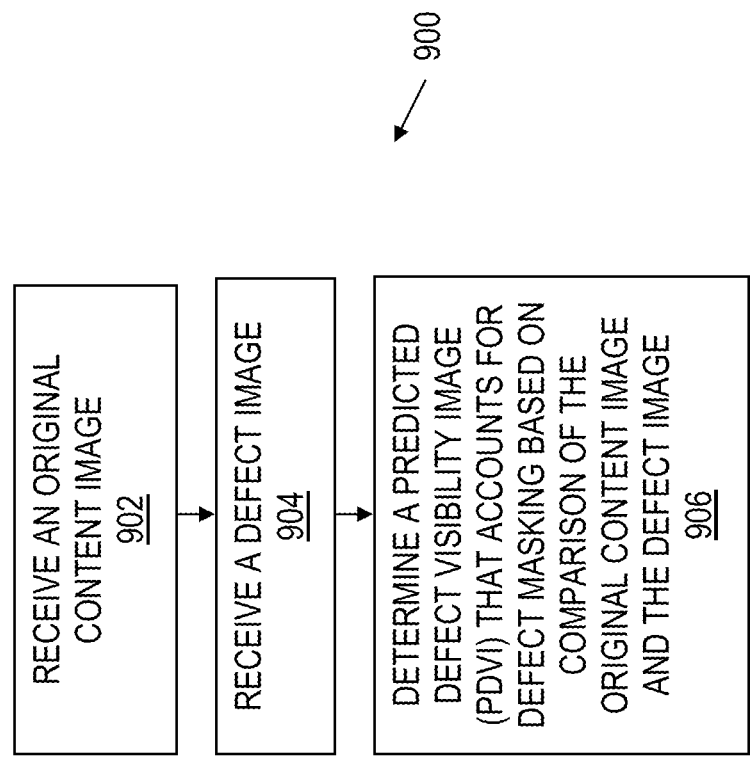
FIG. 9 shows a method in accordance with various examples of the disclosure.

FIG. 9 shows a method 900 in accordance with various examples of the disclosure. The method 900 may be performed, for example, by a processor of a computer system such as computer system 100. As shown, the method 900 comprises receiving an original content image at block 902 and receiving a defect image at block 904. The original content image and the defect image may be obtained as described herein. At block 906, a PDVI that accounts for defect masking is determined based on comparison of the original content image and the defect image.

In FIG. 5, there are three features that are quantized into certain levels to obtain the three classification index images. The three quantized feature images are: 1) the masking potential index image j[m, n]; 2) the lightness index image l[m, n]; and 3) the banding visibility index image k[m, n]. Additional features such as texture, saliency, and facial recognition may be quantized as well. Further, it should be noted that all the input images described herein are gray-scale images. In at least some examples, an image is converted from sRGB space into CIE XYZ space, then is further converted from CIE XYZ space into L*a*b* space. Finally, the L* channel is used as the gray-scale image input.

The quantizers disclosed herein have the same structure. As described herein, the masking potential index image j[m, n], lightness index image l[m, n], and banding visibility (MBM) index image k[m, n] are obtained from the masking potential image M[m, n], the original digital content image $C_o[m, n]$, and the modulated MBM B[m, n], respectively. For the masking potential index image j[m, n], the local standard deviation from the customer's original digital content image $C_o[m, n]$ is used in some examples to obtain the masking potential image M[m, n]. The masking potential image M[m, n] can provide the information about how the image content masks the defect. Then M[m, n] is quantized by a certain level quantizer to obtain the masking potential index image j[m, n].

The mathematical description of the J-quantizer is:

$$j[m, n] = Q^{(M)}(M[m, n]) \quad (1.1)$$

$$= \begin{cases} \lfloor \breve{M}[m, n] \rfloor, & 0 \leq \breve{M}[m, n] < J \\ J - 1, & \breve{M}[m, n] = J \end{cases},$$

$$\breve{M}[m, n] = J \frac{M[m, n] - \min(M[m, n])}{\max(M[m, n]) - \min(M[m, n])}, \quad (1.2)$$

where J is the total number of quantized levels for M[m, n]. Equation (1.1) is the definition of J-quantizer. The purpose of equation (1.2) is to rescale M[m, n] into the interval [0, J]. Then the pixel values in the rescaled image M[m, n] are quantized according to equation (1.1), where $\lfloor x \rfloor$ denotes flooring x to the nearest integer that is less than or equal to x. Furthermore, when rescaled $\breve{M}[m,n]$ has the value J, it is converted to J−1 as in equation (1.1).

For the lightness index image l[m,n], original gray scale image is quantized which is the $L^+$ channel in $L^+a^+b^+$ space to obtain the lightness index image l[m, n]. The definition of the L-quantizer is:

$$l[m, n] = Q^{(C_o)}(C_o[m, n]) \quad (1.3)$$

$$= \begin{cases} \lfloor \check{C}_o[m, n] \rfloor, & 0 \le \check{C}_o[m, n] < L \\ L-1, & \check{C}_o[m, n] = L \end{cases}$$

$$\check{C}_0[m, n] = L \frac{C_0[m, n] - \min(C_0[m, n])}{\max(C_0[m, n]) - \min(C_0[m, n])} \quad (1.4)$$

This mathematical description is similar to the definition of J-quantizer, where L is the total number of quantized levels for $C_o[m, n]$. Equation (1.3) is the definition of L-quantizer. Then equation (1.4) is used to rescale $C_o[m, n]$ into interval [0, L].]. The pixel values in the rescaled image $\check{C}_o[m,n]$ are quantized according to equation (1.3).

For the banding visibility index image $k[m, n]$, the defect image $D[m, n]$ from the original digital content image $C_o[m, n]$ is obtained by subtracting stimuli image $C_b[m, n]$. Then $D[m, n]$ is taken as the input to the Mechanical Band Measurement (MBM) tool. As described herein, the raw MBM score $R[n]$ (1–D) is back projected to obtain a 2-D image referred to herein as a back projected MBM image $M_b[m, n]$, which has constant banding all along the vertical direction. $M_b[m, n]$ is then multiplied by rescaled $D[m, n]$ to obtain a modulated MBM image $B[m, n]$, which predicts how the subjects will see a defect in a gray-scale image. By multiplying $M_b[m, n]$ by the rescaled $D[m, n]$, the defect image modulated MBM $B[m, n]$ can accurately depict the character of the defect in terms of what the subjects observe.

Using the same technique, the banding visibility index image $k[m,n]$ may be determined. In at least some examples, the K-quantizers are defined as:

$$k[m, n] = Q^{(B)}(\check{B}[m, n]) \quad (1.5)$$

$$= \begin{cases} \lfloor \check{B}[m, n] \rfloor, & 0 \le \check{B}[m, n] < L \\ K-1, & \check{B}[m, n] = L \end{cases},$$

$$B[m, n] = M_b[m, n] \frac{D[m, n]}{\max(D[m, n])}, \quad (1.6)$$

$$\check{B}[m, n] = K \frac{B[m, n] - \min(B[m, n])}{\max(B[m, n]) - \min(B[m, n])}, \quad (1.7)$$

where K is the total number of quantized levels for $B[m, n]$. Equation (1.5) is the definition of K-quantizer. Then equation (1.6) defines the modulated MBM image, $B[m,n]$. Equation (1.7) is used to rescale $B[m,n]$ into interval [0,K]. The pixel values in the rescaled image $B[m,n]$ are quantized according to equation (1.5).

In accordance with examples of the disclosure, the masking potential image will account for the image content masking effect, the lightness image will account for the lightness dependence of defect visibility, and the defect visibility image will provide the defect information. The impact of these three features on overall defect visibility is summarized by the three quantized index images, which are analogous to segmentation images. The predicted defect visibility is chosen independently for each different combination of quantizer output levels. For each such combination, the predicted defect visibility is stored as a parameter in the PDVI LUT. By training these quantized images to the modified ground truth information, the parameters can be optimized, and better predict how the subjects observe the defects in a specific region.

In at least some examples, the predictor is simply a 3-D LUT that yields an identical prediction for all occurrences of the same three-tuple of values from the three index images. To specify its structure, the different regions of each quantization level are defined in our index images according to:

$$\Omega_{j_0}^{(M)} = \{[m,n]: j[m,n] = j_0\}, 0 \le j_0 \le J-1 \quad (1.8).$$

$$\Omega_{l_0}^{(C_0)} = \{[m,n]: l[m,n] = l_0\}, 0 \le l_0 \le L-1 \quad (1.9).$$

$$\Omega_{k_0}^{(B)} = \{[m,n]: k[m,n] = k_0\}, 0 \le k_0 \le K-1 \quad (1.10).$$

These three equations are similar. All the pixels with the same quantize level are in the same segment region. The definition of these regions will be used for the training and testing process. The PDVI result is defined as:

$$\hat{G}[m,n] = \epsilon^{(MBC_0)}[j[m,n], k[m,n], l[m,n]] \quad (1.11).$$

Equation (1.11) provides the mapping that will be trained on the modified ground truth images.

Once conversion of the subject marked image $S[m, n]$ to the Modified Ground Truth Image (MGTI) $G_M[m, n]$ is finished, then training the parameters on the modified ground truth information is performed to obtain the optimized parameters for the MMPDVP. After generating the original digital content image and the defect image, these two images are used as input to the MMPDVP with free parameters. Then the cost function is calculated, which penalizes the difference between the output PDVI of the MMPDVP and the modified ground truth data.

The cost function in a simple form is defined as following:

$$\phi = \sum_{j=0}^{J-1} \sum_{k=0}^{K-1} \sum_{l=0}^{L-1} \sum_{(m,n) \in \Omega_j^{(M)} \cap \Omega_k^{(B)} \cap \Omega_l^{(C_0)}} |\hat{G}[m, n] - G_M[m, n]|^2. \quad (2.1)$$

Here the regions $\Omega_{j_0}^{(M)}, \Omega_{l_0}^{(C_0)}, \Omega_{k_0}^{(B)}$ are defined by equation (1.8), (1.9), and (1.10). The image $\hat{G}[m, n]$ is the predicted defect visibility image (PDVI); and the image $G_M[m, n]$ is the modified ground truth image (MGTI). For each region with a different j, k, and l combination, the mean square error between the MGTI and the PDVI is calculated. In this case, a closed form for the optimal PDVI For each region with a different j, k, and l combination, the mean square error between the MGTI and the PDVI is calculated. In this case, a closed form for the optimal parameters $\delta_{OPT}^{(MBC_o)}[j,k,l]$ is used. By minimizing the cost function, the optimized prediction is defined as:

$$\delta_{OPT}^{(MBC_o)}[j, k, l] = \frac{\sum_{[m,n] \in \Omega_j^{(M)} \cap \Omega_k^{(B)} \cap \Omega_l^{(C_0)}} G_M[m, n]}{\sum_{[m,n] \in \Omega_j^{(M)} \cap \Omega_k^{(B)} \cap \Omega_l^{(C_0)}} 1}. \quad (2.2)$$

This is the mean of the image $G_M[m, n]$ conditioned on the pixel values of the three index images being (j,k,l).

In one example of the algorithm, the parameters are trained on multiple image sets, each such set comprising a modified ground truth image 702, an original digital content image 704, and a defect image 706, as illustrated in FIG. 7. In this case, the cost function will be:

$$\phi = \sum_{i=0}^{I-1} \sum_{j=0}^{J-1} \sum_{k=0}^{K-1} \sum_{l=0}^{L-1} \sum_{[m,n] \in {}^{I}\Omega_{j,k,l}^{(MBC_0)}} |{}^{I}\hat{G}[m,n] - {}^{I}G_M[m,n]|^2, \quad (2.3)$$

as the total squared error between the predicted and actual ground truth. Here the parameter i indexes the image sets 702, 704, and 706 used for the training, and l is the total number of such image sets used for training. For each region with a different combination of values for j, k, and l, the total squared error is calculated between the MGTI and the PDVI. By minimizing the cost function, the optimized parameters $\grave{o}_{OPT}^{(MBC_0)}[j,k,l]$ are obtained as $$\grave{o}_{OPT}^{(MBC_0)}[j,k,l] = \frac{\sum_{i=0}^{I-1} \sum_{[m,n] \in {}^{I}\Omega_{j,k,l}^{(MBC_0)}} {}^{i}G_M[m,n]}{\sum_{i=0}^{I-1} \sum_{[m,n] \in {}^{I}\Omega_{j,k,l}^{(MBC_0)}} 1}. \quad (2.4)$$

which is the conditional mean of $G_M[m, n]$, given the three-tuple value [j; k; l] for the three index images. These optimized parameters $\grave{o}_{OPT}^{MBC_0}[j,k,l]$ are stored in the PDVI LUT.

As previously discussed, texture and saliency may additionally or alternatively be used to identify a PDVI. The textured areas in natural images may be detected, for example, using an indicator based on component counts. Further, a Gabor filter may be employed for texture detection or segmentation. Further, face detection may be used to identify important regions that would be given a higher weighting for defect visibility in computing the PDVI. Further, a filter bank for image segmentation and classification may be used. Further, the MMDVP model may be changed to a classifier such as a Gaussian Mixture Model (GMM) or a Support Vector Machine (SVM). Further, the scope of this invention is not limited to banding as the only defect. There are many other printing issues, such as oil spots and unexpected marks on the print. Unlike banding defects, some of these types of defects may be more noticeable on a face or main areas of an image. Therefore, in some examples, face detection and a saliency map may be additional features to address these types of defects. Finally, operations such as examination of the values for the error metric after optimization, investigating the effectiveness of training, and cross-validating may be performed to test updates to the model.

Figure 24:
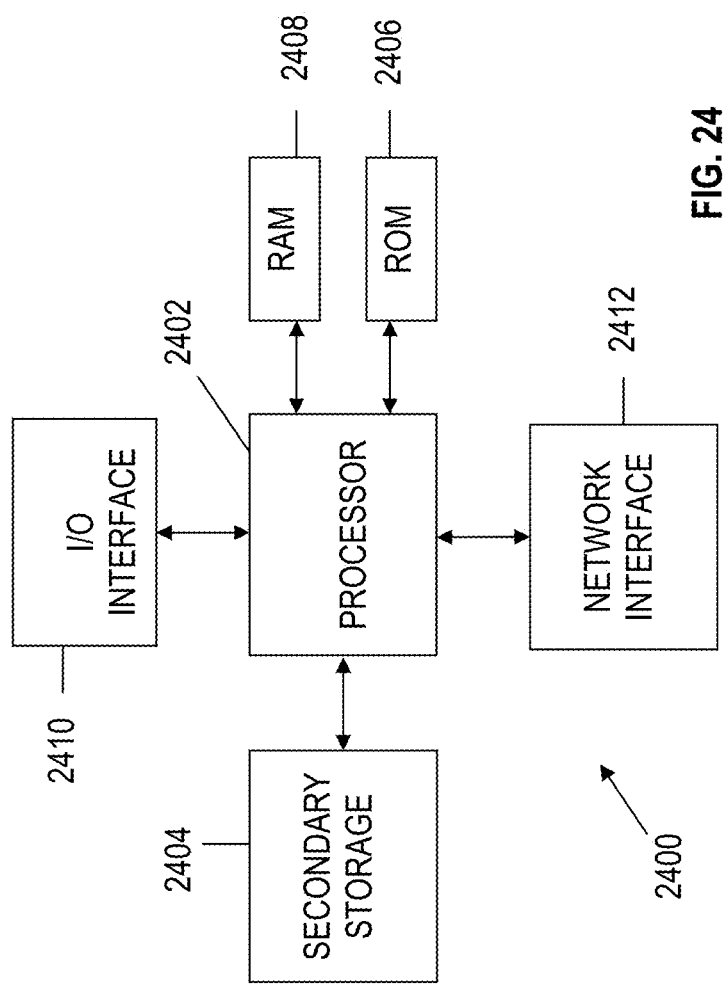
FIG. 24 shows another computer system in accordance with an example of the disclosure.

The MMPDVP techniques as disclosed above may be implemented with any general-purpose computing component, such as an application-specific integrated chip (ASIC), a computer, or a network component with sufficient processing power, memory resources, and network throughput capability to handle the necessary workload placed upon it. FIG. 24 illustrates a typical, general-purpose computer system 2400 suitable for implementing one or more examples of the components disclosed herein. The computer system 2400 includes a processor 2402 (which may be referred to as a central processor unit or CPU) that is in communication with memory devices including secondary storage 2404, read only memory (ROM) 2406, and random access memory (RAM) 2408, with an input/output (I/O) interface 2410, and with a network interface 2412. The processor 2402 may be implemented as one or more CPU chips, or may be part of one or more application specific integrated circuits (ASICs).

The secondary storage 2404 is typically comprised of one or more disk drives, flash devices, or tape drives and is used for non-volatile storage of data and as an over-flow data storage device if RAM 2408 is not large enough to hold all working data. Secondary storage 2404 may be used to store programs that are loaded into RAM 2408 when such programs are selected for execution. The ROM 2406 is used to store instructions and perhaps data that are read during program execution. ROM 2406 is a non-volatile memory device that typically has a small memory capacity relative to the larger memory capacity of secondary storage 2404. The RAM 2408 is used to store volatile data and perhaps to store instructions. Access to both ROM 2406 and RAM 2408 is typically faster than to secondary storage 2404. The RAM 2408, the ROM 2406, the second storage 2404, and the memory 108 of FIG. 1 are examples of non-transitory computer-readable media.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A system comprising: a processor;
a memory coupled to said processor; and
wherein the memory stores an image defect visibility predictor that, when executed by the processor, compares an original image with a defect image and outputs a predicted defect visibility image (PDVI) that accounts for defect masking by the original image,
wherein the PDVI is based on a masking potential value that provides information about how content of the original image masks a defect in the defect image,
wherein the image defect visibility predictor employs a look-up table (LUT) to select the PDVI based on a masking potential index image, a lightness index image, and a banding visibility index image,
wherein the image defect visibility predictor determines the masking potential index image by quantizing a masking potential image that results from application of a local standard deviation to the original image.

2. The system of claim 1, wherein the defect image is based on comparing the original image with a scanned printout of the original image.

3. The system of claim 1, wherein the image defect visibility predictor determines the masking potential value and a lightness value for the original image, determines a banding visibility value for the defect image, and outputs the predicted defect visibility image based on the masking potential value, the lightness value, and the banding visibility value.

4. The system of claim 1, wherein the image defect visibility predictor determines a texture map based on the original image and selects the PDVI based on the texture map.

5. The system of claim 1, wherein the image defect visibility predictor determines a saliency-object map based on the original image and selects the PDVI based on the saliency-object map.

6. The system of claim 1, wherein the image defect visibility predictor determines the lightness index image by quantizing lightness values detected for the original image and determines the banding visibility index image by quantizing a banding visibility image determined for the defect image.

7. The system of claim 1, wherein the image defect visibility predictor is trained using a set of ground truth images marked by human subjects.

8. A non-transitory computer-readable medium that stores an image defect visibility predictor program that, when executed, causes a processor to output a predicted defect visibility image (PDVI) that accounts for defect masking based on comparison of an original image with a defect image, wherein the PDVI is based on a masking potential value that provides information about how content of the original image masks a defect in the defect image.

9. The non-transitory computer-readable medium of claim 8, wherein the image defect visibility predictor program further causes the processor to compare the original image with a scanned printout of the original image to determine the defect image.

10. The non-transitory computer-readable medium of claim 8, wherein the image defect visibility predictor program further causes the processor to determine the masking potential value and a lightness value for the original image, to determine a banding visibility value for the defect image, and to output the PDVI based on the masking potential value, the lightness value, and the banding visibility value.

11. The non-transitory computer-readable medium of claim 8, wherein the image defect visibility predictor program further causes the processor to determine a masking potential index image and a lightness index image based on the original image, and to determine a banding visibility index image based on the defect image.

12. The non-transitory computer-readable medium of claim 11, wherein the image defect visibility predictor program further causes the processor to access a look-up table (LUT) to select the PDVI based on the masking potential index image, the lightness index image, and the banding visibility index image.

13. The non-transitory computer-readable medium of claim 11, wherein the image defect visibility predictor program further causes the processor to determine the masking potential index image, the lightness index image, and the banding visibility index image by quantizing masking potential values, lightness values, and banding visibility values.

14. A method comprising:
receiving, by a processor, an original image;
receiving, by the processor, a defect image; and
determining, by the processor, a predicted defect visibility image (PDVI) that accounts for defect masking based on comparison of the original image and the defect image; and
outputting, by the processor, the PDVI that accounts for defect masking by the original image,
wherein the PDVI is graphically coded to indicate a probability value that a defect in the defect image will be detectable.

15. The method of claim 14 further comprising determining the defect image by comparison of the original image with a scanned printout of the original image.

16. The method of claim 14 further comprising determining a masking potential value and a lightness value for the original content image, determining a banding visibility value for the defect image, and determining the PDVI based on the masking potential value, the lightness value, and the banding visibility value.

17. The method of claim 16, wherein determining the PDVI comprises accessing a look-up table (LUT) and selecting the PDVI based on the masking potential value, the lightness value, and the banding visibility value.

18. The method of claim 16, further comprising training an image defect visibility predictor algorithm based on a set of ground truth images marked by human subjects and determining the PDVI using the trained image defect visibility predictor algorithm.

* * * * *